US012586741B2

(12) United States Patent
Chen et al.

(10) Patent No.: US 12,586,741 B2
(45) Date of Patent: Mar. 24, 2026

(54) BACKLIGHT MODULE FOR LIGHTING KEYBOARD

(71) Applicant: Darfon Electronics Corp., Taoyuan City (TW)

(72) Inventors: Yen-Chang Chen, Taoyuan City (TW); Heng-Yi Huang, Taoyuan City (TW)

(73) Assignee: Darfon Electronics Corp., Taoyuan City (TW)

( * ) Notice: Subject to any disclaimer, the term of this patent is extended or adjusted under 35 U.S.C. 154(b) by 300 days.

(21) Appl. No.: 18/374,073

(22) Filed: Sep. 28, 2023

(65) Prior Publication Data

US 2024/0112870 A1     Apr. 4, 2024

Related U.S. Application Data

(60) Provisional application No. 63/378,261, filed on Oct. 4, 2022, provisional application No. 63/459,264, filed on Apr. 14, 2023.

(51) Int. Cl.
H01H 13/83 (2006.01)
F21V 8/00 (2006.01)

(52) U.S. Cl.
CPC ........... H01H 13/83 (2013.01); G02B 6/0043 (2013.01); G02B 6/0055 (2013.01); H01H 2219/04 (2013.01)

(58) Field of Classification Search
CPC ....... H01H 2219/036; H01H 2219/038; H01H 2219/039; H01H 2219/044;

(Continued)

(56) References Cited

U.S. PATENT DOCUMENTS 6,743,993 B1 *   6/2004   Clark ................... H01H 13/702
                                                           200/314
11,036,306 B2    6/2021   Cheng
                          (Continued)

FOREIGN PATENT DOCUMENTS

CN          106783308 A      5/2017
CN          108305810 A      7/2018
                  (Continued)

OTHER PUBLICATIONS

Office action of counterpart application by Taiwan IP Office on Aug. 10, 2023.

(Continued)

*Primary Examiner* — Anthony R Jimenez

(57)              ABSTRACT

A backlight module for a lighting keyboard comprises a lighting board including light emitting units, a light guide panel disposed on the lighting board and including light guide holes, and a shielding sheet disposed on the light guide panel. Each light emitting unit is located in each light guide hole. The backlight module is divided into regions including a middle region and two first side regions located outside the middle region. The light guide holes include at least one middle light guide hole in the middle region and at least one first light guide hole in the first side region. A distance between a light emitting unit located in the middle light guide hole and a wall of the middle light guide hole is lesser than a distance between a light emitting unit located in the first light guide hole and a wall of the first light guide hole.

20 Claims, 15 Drawing Sheets

(58) Field of Classification Search
CPC ....... H01H 2219/046; H01H 2219/054; H01H
2219/058; H01H 2219/06; H01H
2231/002; H01H 2219/04; H01H 13/00;
H01H 13/02; H01H 13/04; H01H 13/14;
H01H 13/50; H01H 13/70; H01H 13/702;
H01H 13/704; H01H 13/705; H01H
13/7057; H01H 2003/12; H01H 2013/00;
H01H 2013/02; H01H 2013/50; H01H
2013/52; H01H 3/00; H01H 3/12; H01H
13/83; G02B 6/0043; G02B 6/055
USPC ........................................................ 200/314
See application file for complete search history.

(56) References Cited

U.S. PATENT DOCUMENTS

| | | | |
|---|---|---|---|
| 11,257,638 | B2 | 2/2022 | Liang et al. |
| 11,366,263 | B1 | 6/2022 | Ho et al. |
| 11,409,373 | B2 | 8/2022 | Cheng |
| 11,443,907 | B2 | 9/2022 | Ho et al. |
| 11,515,107 | B2 | 11/2022 | Chen |
| 11,538,641 | B2 | 12/2022 | Liang |
| 11,804,343 | B2 | 10/2023 | Chen |
| 2011/0037730 | A1 | 2/2011 | Wang et al. |
| 2014/0166457 | A1 | 6/2014 | Chen |
| 2019/0027326 | A1 | 1/2019 | Tsai et al. |
| 2019/0369744 | A1 | 12/2019 | Wu et al. |
| 2023/0047235 | A1 | 2/2023 | Chen |

FOREIGN PATENT DOCUMENTS

| | | |
|---|---|---|
| CN | 110335775 A | 10/2019 |
| CN | 112490046 A | 3/2021 |
| CN | 214254209 U | 9/2021 |
| JP | 2019139728 A | 8/2019 |
| TW | M334393 U | 6/2008 |
| TW | M395202 U | 12/2010 |
| TW | 201820366 A | 6/2018 |
| TW | 201824318 A | 7/2018 |
| TW | I632577 B | 8/2018 |
| TW | I725894 B | 4/2021 |

OTHER PUBLICATIONS

Office action of related application by the USPTO on Aug. 28, 2023.

* cited by examiner

BACKLIGHT MODULE FOR LIGHTING KEYBOARD

This application claims the benefit of U.S. Provisional Application No. 63/378,261, filed on Oct. 4, 2022, and claims the benefit of U.S. Provisional Application No. 63/459,264, filed on Apr. 14, 2023. The contents of these applications are incorporated herein by reference.

FIELD OF THE INVENTION

The invention relates to a backlight module for a lighting keyboard.

DESCRIPTION OF THE PRIOR ART

As technology advances, there are many types of keyboards in use. Users pay much more attention to visual effect of keyboard except basic input function while choosing keyboard. So far a lighting keyboard has been developed. The lighting keyboard attracts users in visual effect and can be used in darkness. Since the lighting keyboard of the prior art applies a low luminous light emitting diode (LED) to illuminate each of square keyswitches, the following problems may occur: 1) the main symbol above the LED is over-illuminated and the corner symbol(s) of keycap is too dark; 2) the surrounding outlet for keycap peripheral is inconsistent; and 3) the overall illuminating consistency on a single square keyswitch and on plural keyswitches are both not good.

SUMMARY OF THE INVENTION

The invention is directed to provide a backlight module for a lighting keyboard, so as to solve the aforesaid problems.

According to a first aspect of the invention, a backlight module for a lighting keyboard comprises a lighting board, a light guide panel and a shielding sheet. The lighting board includes a plurality of light emitting units. The light guide panel is disposed on the lighting board and includes a plurality of light guide holes, and each of the light emitting units is located in each of the light guide holes. The shielding sheet is disposed on the light guide panel. The backlight module is divided into a plurality of regions including a middle region and two first side regions, and the two first side regions are located outside the middle region. The light guide holes include at least one middle light guide hole and at least one first light guide hole. The middle light guide hole is in the middle region, and the first light guide hole is in the first side region. A distance between a light emitting unit located in the middle light guide hole and a wall of the middle light guide hole is lesser than a distance between a light emitting unit located in the first light guide hole and a wall of the first light guide hole.

According to a second aspect of the invention, a backlight module for a lighting keyboard comprises a plurality of microstructure regions, a light guide panel and a shielding sheet. The shielding sheet is disposed on the light guide panel and disposed above the microstructure regions. The shielding sheet has a plurality of translucent regions, and the microstructure regions are partly exposed in each of the translucent regions. The backlight module is divided into a plurality of regions including a middle region and two first side regions, and the two first side regions are located outside the middle region. The translucent regions are distributed in the middle region and the two first side regions.

An average density of microstructural dots of the microstructure region exposed by the translucent region which is in the middle region relative to the area of the translucent region which is in the middle region is lesser than an average density of the microstructural dots of the microstructure region exposed by the translucent region which is in the first side region relative to the area of the translucent region which is in the first side region.

According to a third aspect of the invention, a backlight module for a lighting keyboard comprises a lighting board, a light guide panel and a shielding sheet. The light guide panel is disposed on the lighting board. The shielding sheet is disposed on the light guide panel. The shielding sheet has a plurality of translucent regions and a plurality of inner reflective sections. Each of the inner reflective sections is in each of the translucent regions. The backlight module is divided into a plurality of regions including a middle region and two first side regions, and the two first side regions are located outside the middle region. The translucent regions are distributed in the middle region and the two first side regions. A size of the inner reflective section in the translucent region which is in the middle region is lesser than a size of the inner reflective sections in the translucent region which is in the first side region.

These and other objectives of the present invention will no doubt become obvious to those of ordinary skill in the art after reading the following detailed description of the preferred embodiment that is illustrated in the various figures and drawings.

DETAILED DESCRIPTION

A low power light emitting unit, e.g. mini LED or micro LED, may be used to reduce power consumption, reduce total heat generated by a backlight module, and reduce the overall thickness of the backlight module, such that it is beneficial to further make a lighting keyboard thinner. However, the highly limited luminous range of mini LED or micro LED causes a great challenge to the luminous uniformity of a single keyswitch and the entire lighting keyboard. The embodiments of the invention first focus on how to make a large proportion of light from the light emitting unit enter a light guide panel for lateral transmission, and how to effectively recycle the light that passes through the light guide panel during the lateral transmission into the light guide panel for reuse.

Figure 1:
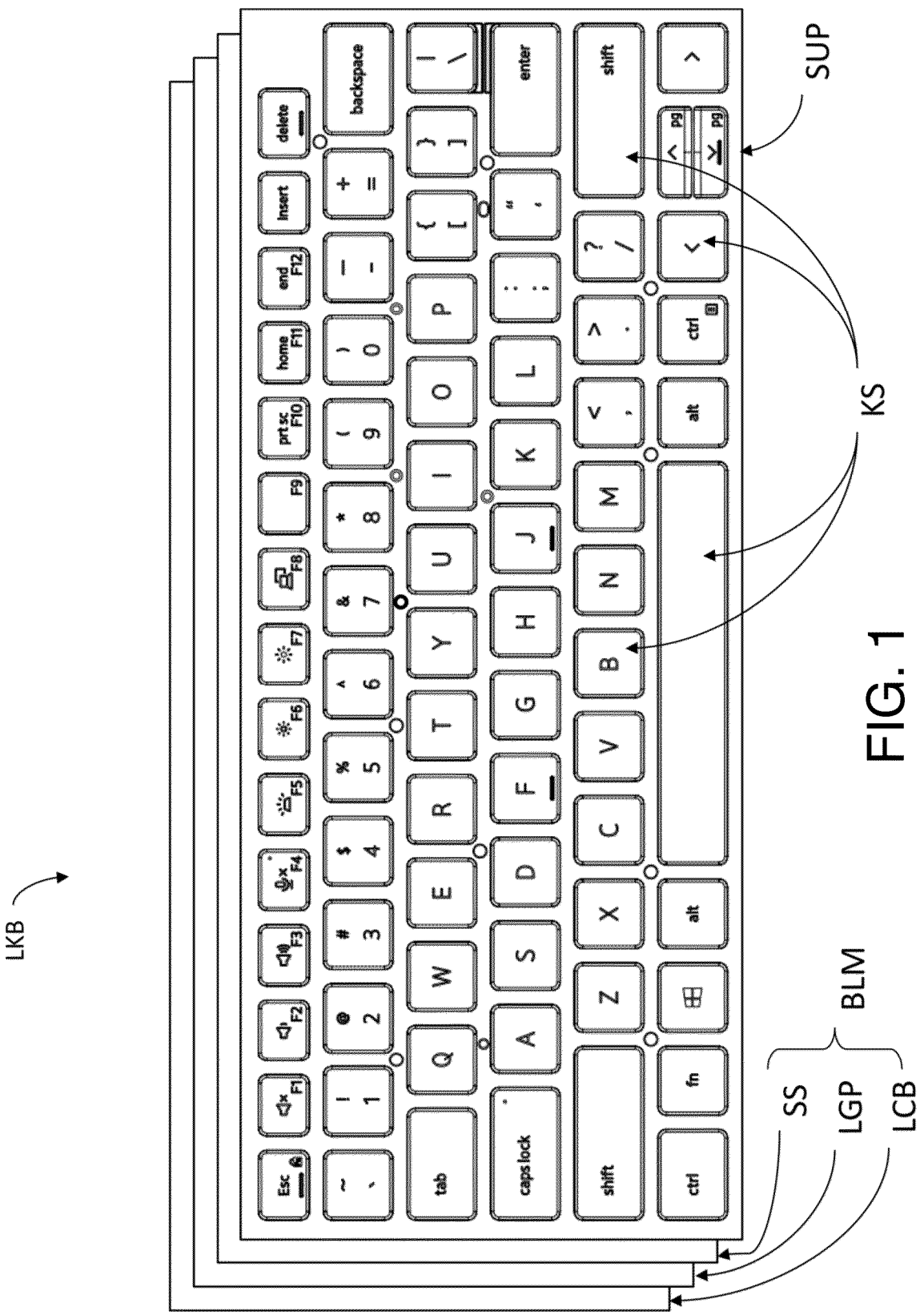
FIG. 1 is a schematic view illustrating a lighting keyboard according to an embodiment of the invention.

Referring to FIG. 1, FIG. 1 is a schematic view illustrating a lighting keyboard LKB according to an embodiment of the invention.

As shown in FIG. 1, the lighting keyboard LKB comprises a backlight module BLM and a plurality of keyswitches KS. A support plate SUP is disposed on the backlight module BLM and the keyswitches KS are disposed on the support plate SUP. In general, the keyswitches KS may comprise square keys and multiple keys (e.g. space key). It should be noted that the number, size and arrangement of the keyswitches KS may be determined according to practical applications, so the invention is not limited to the embodiment shown in the figure.

The backlight module BLM comprises a lighting board LCB, a light guide panel LGP and a shielding sheet SS. The light guide panel LGP is disposed on the lighting board LCB and the shielding sheet SS is disposed on the light guide panel LGP. Each keyswitch KS on the lighting keyboard LKB corresponds to at least one light emitting unit (e.g. LED) on the lighting board LCB of the backlight module BLM.

Figure 2:
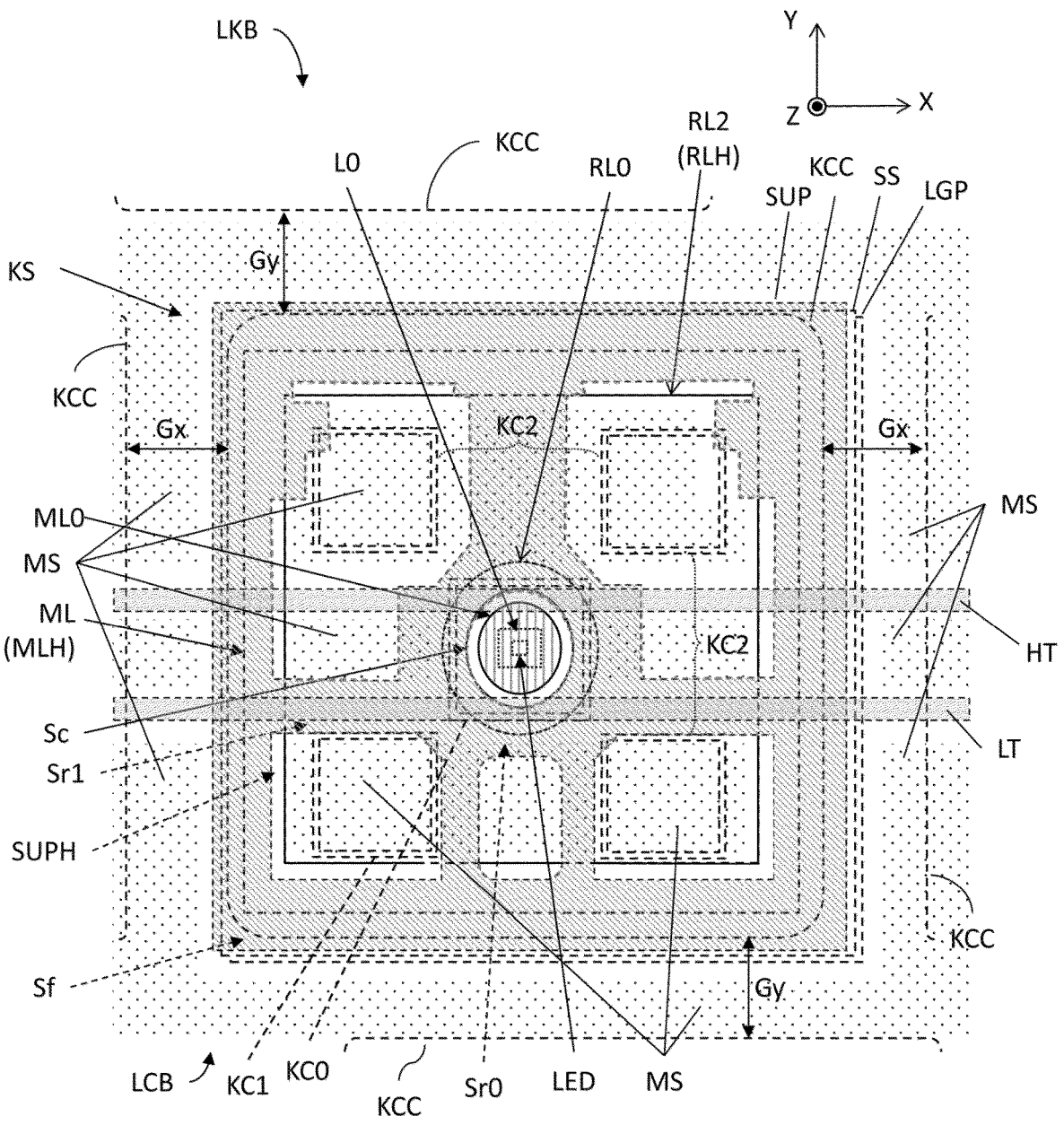
FIG. 2 is a partial top view illustrating the lighting keyboard shown in FIG. 1.
Figure 3:
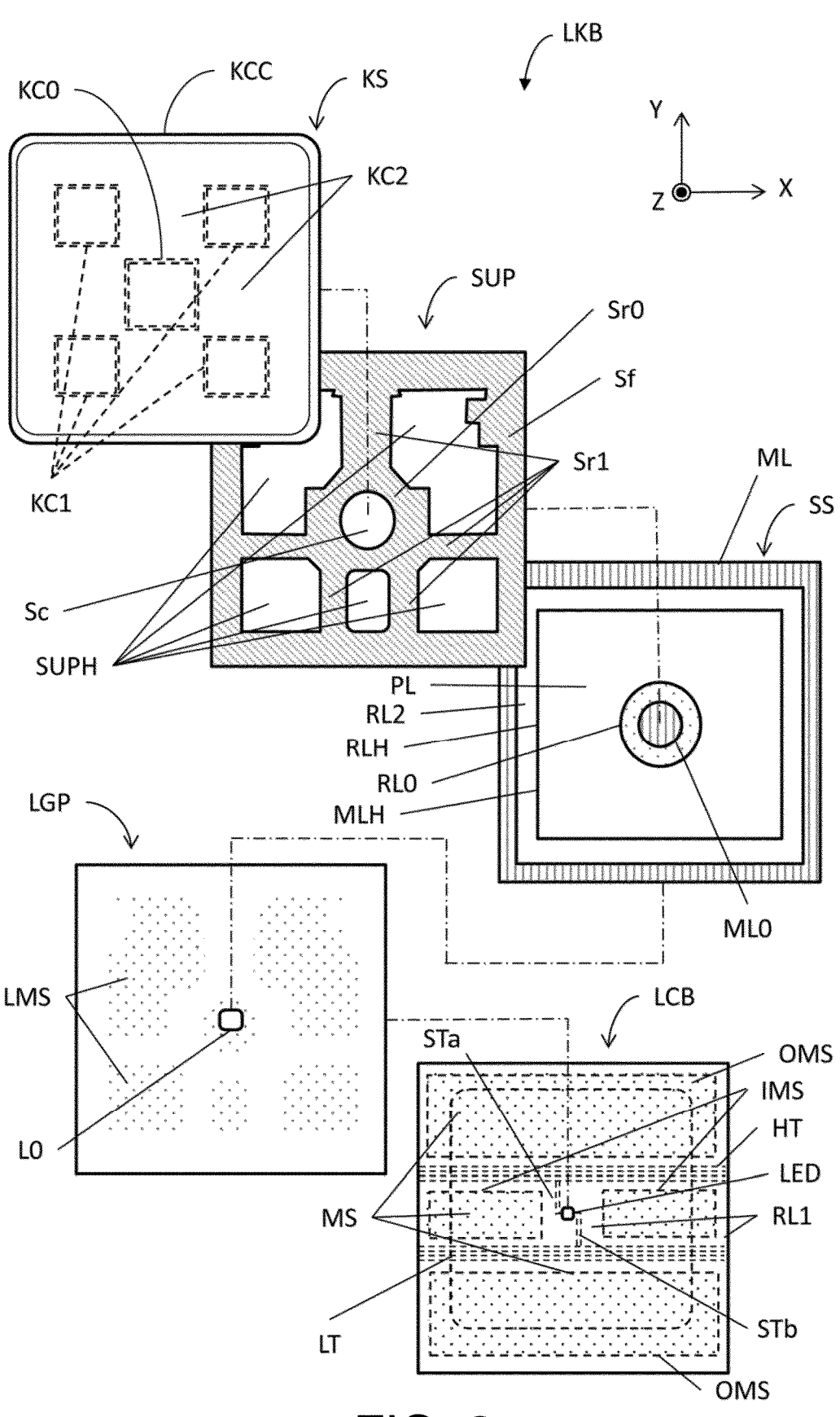
FIG. 3 is a partial exploded view illustrating the lighting keyboard shown in FIG. 1.
Figure 4:
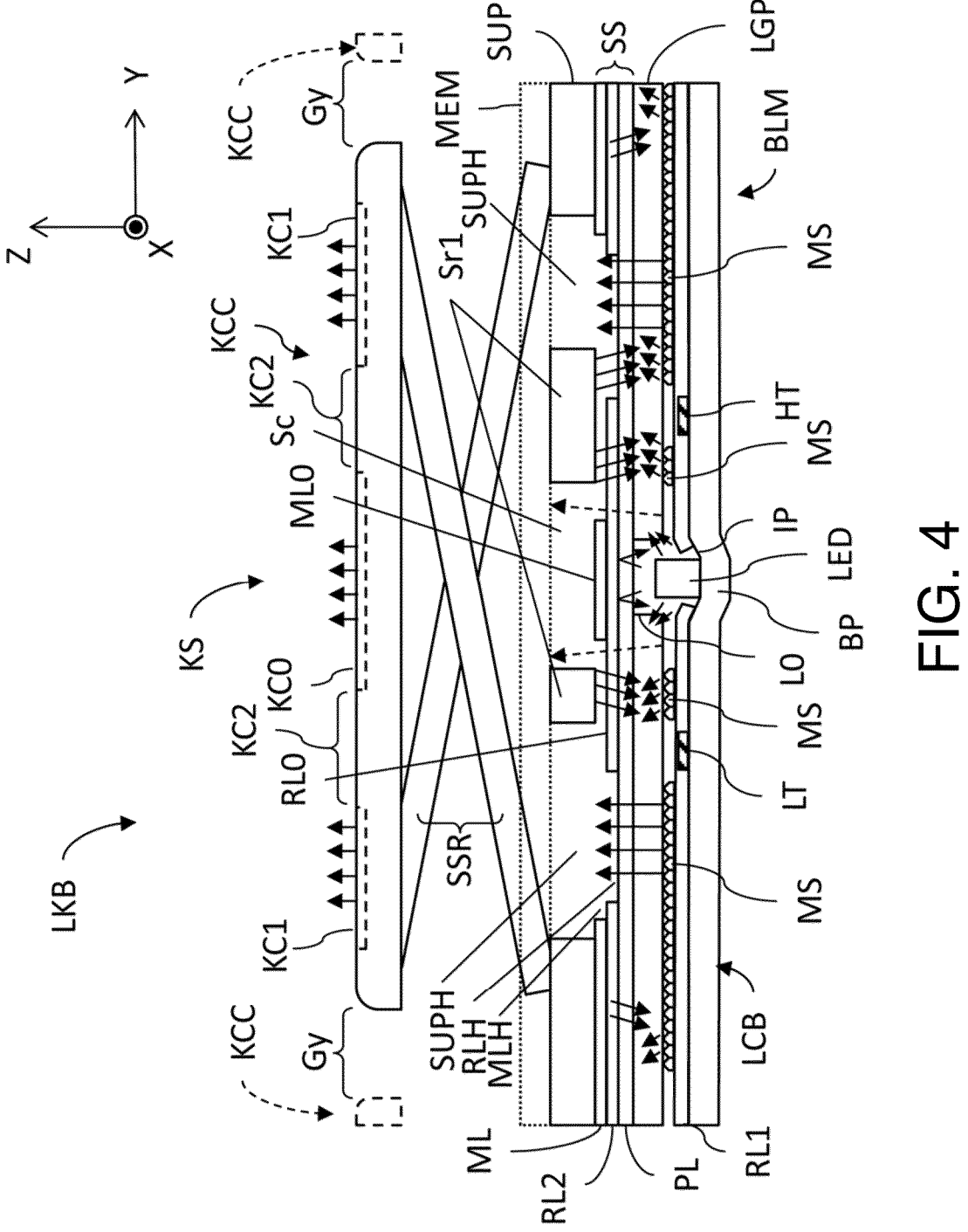
FIG. 4 is a partial sectional view illustrating the lighting keyboard shown in FIG. 1.

Referring to FIGS. 2 to 4, FIG. 2 is a partial top view illustrating the lighting keyboard LKB shown in FIG. 1, FIG. 3 is a partial exploded view illustrating the lighting keyboard LKB shown in FIG. 1, and FIG. 4 is a partial sectional view illustrating the lighting keyboard LKB shown in FIG. 1.

As shown in FIGS. 2 to 4, the lighting board LCB comprises two non-intersecting traces LT, HT, another two non-intersecting traces STa, STb, a light emitting unit LED, a first reflective layer RL1 and a plurality of microstructure regions MS. The lighting board LCB may be a lighting circuit board. The light emitting unit LED is connected between the two non-intersecting traces STa, STb, and the light emitting unit LED is connected between the two non-intersecting traces LT, HT through the two non-intersecting traces STa, STb. In this embodiment, the traces LT, HT are main traces of the light emitting unit LED and the traces STa, STb are sub-traces of the light emitting unit LED, wherein the trace LT may be a low-voltage trace and the trace HT may be a high-voltage trace. The light emitting unit LED may be a white LED or a combination of RGB LEDs according to practical applications. In general, the traces LT, HT may be the main traces with a larger cross-sectional area and may cross a plurality of keyswitches KS. The traces LT, HT do not intersect at least within a range of a single keyswitch KS, or do not intersect within a larger continuous range including a plurality of adjacent keyswitches KS and the gap(s) therebetween. The pair of traces STa, STb disposed within the range of each single keyswitch KS are sub-traces with a lesser cross-sectional area. Although the traces STa, STb may be located at the same line, the ends of the traces STa, STb are respectively connected to two electrodes of the light emitting unit LED. Thus, the traces STa, STb do not overlap with each other.

The first reflective layer RL1 is disposed on the two non-intersecting traces LT, HT and the other two non-intersecting traces STa, STb. The microstructure regions MS are formed on the first reflective layer RL1. In this embodiment, the microstructure regions MS may be a concave-convex structure formed on the first reflective layer RL1. For example, the lighting board LCB may be composed of a flexible circuit board and a copper mesh may be commonly used to improve the support strength of the circuit board. The first reflective layer RL1 may be formed by coating reflective paint or covering a reflective film on the surface of the flexible circuit board (including the surface of the copper mesh). The grid structure of the copper mesh may make the first reflective layer RL1 form regular concave points (grid points) and convex regions (grid lines). The concave points and convex regions function as reflective points capable of reflecting light back to the light guide panel LGP. In fact, copper wire regions (e.g. traces LT, HT, STa, STb) may also form protruding linear reflective regions. In principle, the copper mesh does not overlap with the traces LT, HT on the flexible circuit board and does not electrically connect the traces STa, STb. In practical applications, the copper mesh can achieve an effect of shielding radio frequency interference, so the copper mesh may be connected to the ground of the traces. However, in practice, a concave-convex reflective structure may not be possible to be formed by any reflective layer covering the copper mesh and traces. If the first reflective layer RL1 is an independent thin film component, the thickness of the first reflective layer RL1 must be thin enough, e.g. lower than the thickness of the copper foil substrate (including the adjacent tiled copper mesh and copper wire region). Furthermore, the first reflective layer RL1 needs to have a high degree of plasticity, so as to form a concave-convex microstructure on the copper mesh and copper wire region when covering the copper foil substrate. If the first reflective layer RL1 is formed by ink coating, the coating thickness, ink consistency, coating region control, etc. must be strictly controlled; otherwise the hollow space of the original copper foil substrate will be easily filled by ink flow, which will reduce the depth of the reflective microstructure and the effect of reflective diffusion.

In addition, even if the traces of the lighting board LCB are not copper foil substrate, there is neither a thicker copper trace nor a copper mesh to strengthen the structural strength of the lighting board LCB, a microstructure with a diffusion effect may still be formed on the first reflective layer RL1. For example, micro-dot ink may be printed on the first reflective layer RL1 to form concave/convex regions as the microstructure regions MS; or the ink with larger size reflective particles may be used to spray or print the first reflective layer RL1 to simultaneously form the concave/convex regions as the microstructure regions MS; or, if the first reflective layer RL1 is a layer of reflective film, as long as the surface of the reflective film has reflective particles with medium or low flatness and has a concave-convex reflective surface, the reflective film may be used as the microstructure regions MS.

The microstructure regions MS do not overlap with the two non-intersecting traces LT, HT, and the microstructure regions MS do not overlap with the two non-intersecting traces STa, STb either. In this embodiment, within a range of a single keyswitch KS, the microstructure regions MS comprises two inner microstructure regions IMS and two outer microstructure regions OMS, wherein the two inner microstructure regions IMS are located between the two non-intersecting traces LT, HT, and the two outer microstructure regions OMS are located beyond the two non-intersecting traces LT, HT. The patterns of the two inner microstructure regions IMS may be different from the patterns of the two outer microstructure regions OMS, but the invention is not so limited. The light emitting unit LED is located between the microstructure regions MS, i.e. the light emitting unit LED is located between the two inner microstructure regions IMS and also located between the two outer microstructure regions OMS. For further explanation, the two inner microstructure regions IMS may be located at opposite sides of the light emitting unit LED, and the two outer microstructure regions OMS may be located at opposite sides of the two non-intersecting traces LT, HT. In other words, the two inner microstructure regions IMS are spaced apart from each other and the two outer microstructure regions OMS are spaced apart from each other. Accordingly, the microstructure regions MS can effectively reflect the light back to the light guide panel LGP, so as to enhance the overall illuminating consistency.

In this embodiment, the traces STa, STb separate the two inner microstructure regions IMS, so the traces STa, STb are also located between the two inner microstructure regions IMS. Similarly, the traces LT, HT respectively separate one outer microstructure region OMS and two inner microstructure regions IMS, so it can also be said that the traces LT, HT are respectively located between one outer microstructure region OMS and two inner microstructure regions IMS. In some embodiments, the aforesaid microstructure regions MS, no matter whether they are the outer microstructure regions OMS or the inner microstructure regions IMS, neither overlap with the traces LT, HT, nor overlap with the traces STa, STb. For example, there is the case when the traces of the lighting board LCB are formed by copper wires with copper mesh. If the microstructure regions MS on the first reflective layer RL1 is only surface-treated and not formed from the underlying copper mesh or other substrates, the microstructure regions MS/OMS/IMS may overlap with the traces LT, HT, or overlap with the traces STa, STb.

The light guide panel LGP has a light guide hole L0 and the light emitting unit LED is located in the light guide hole L0. The top surface and/or the bottom surface of the light guide panel LGP close to the light guide hole L0 may have adhesive around the light guide hole L0 to adhere the shielding sheet SS and/or the lighting board LCB respectively. Furthermore, the light guide panel LGP also has a plurality of microstructure regions LMS corresponding to the positions of an inner hole Sc and peripheral holes SUPH of the support plate SUP, so as to guide the light transmitted in the light guide panel LGP to emit out upward. Under the orthographic projection of the peripheral hole SUPH of the support plate SUP, the microstructure regions LMS of the light guide panel LGP may at least partially overlap with the microstructure regions MS of the first reflective layer RL1 of the lighting board LCB, such that it may increase the illuminating effect of the light passing through the inner hole Sc and the peripheral hole SUPH, and improve the brightness of the corner symbol of the keycap KCC (outer outlet KC1). The inner microstructure regions IMS, which is on the first reflective layer RL1 of the lighting board LCB and close to the light emitting unit LED, may be used as an optical adjustment manner. When the light output near the light emitting unit LED is excessively weakened (e.g. resulted from the area of an inner mask layer ML0 of a mask layer ML of the shielding sheet SS is too large, or the light transmittance of an inner reflective section RL0 of a second reflective layer RL2 is too low), at this time, the inner microstructure regions IMS, which is on the first reflective layer RL1 of the lighting board LCB and close to the light emitting unit LED, can enhance the illuminating effect of the light passing through the inner hole Sc or the inner outlet KC0 of the keycap KCC.

A preferred manner to optimize the arrangement of the aforesaid microstructure regions MS/OMS/IMS is to dispose the traces STa, STb, LT, HT as far as possible to overlap with any rib region or frame region (e.g. surrounding rib Sr0, bridge rib Sr1 and support frame Sf) of the support plate SUP. Thus, the aforesaid microstructure regions MS/OMS/IMS may correspond to the microstructure regions LMS of the light guide panel LGP, correspond to the peripheral hole SUPH or the inner hole Sc of the support plate SUP, and correspond to the inner outlet KC0 and the outer outlet KC1 of the keycap KCC. Furthermore, the microstructure regions MS/OMS/IMS may overlap with the surrounding rib Sr0, the bridge rib Sr1 or the support frame Sf. Although these positions cannot emit light, the microstructure regions MS/OMS/IMS can help guide the light that escapes from the light guide panel LGP into the light guide panel LGP for recycling, such that it is helpful for enhancing the illuminating effect of the light emitted from the outer side or even another adjacent keyswitch KS. Needless to say, the aforesaid microstructure regions MS/OMS/IMS may also overlap with the second reflective layer RL2 of the shielding sheet SS (including the inner reflective section RL0 and the outer frame of the second reflective layer RL2), and that is also helpful to recycle light into the light guide panel LGP.

The shielding sheet SS is disposed above the microstructure regions MS. The shielding sheet SS comprises a mask layer ML, a second reflective layer RL2 and a protection layer PL, wherein the mask layer ML, the second reflective layer RL2 and the protection layer PL may be stacked with each other by various manners. For example, each of the mask layer ML, the second reflective layer RL2 and the protection layer PL may be stacked on top, middle or bottom to form the shielding sheet SS. The mask layer ML is opaque. The second reflective layer RL2 may have reflective and translucent characteristics at the same time, i.e. the second reflective layer RL2 may reflect part of the light and allow part of the light to pass through. The mask layer ML may be black ink and the second reflective layer RL2 may be white ink, but the invention is not so limited. In this embodiment, the mask layer ML has a mask layer hole MLH and an inner mask layer ML0 located in the mask layer hole MLH, and the second reflective layer RL2 has a reflective layer hole RLH and an inner reflective section RL0 located in the reflective layer hole RLH. The mask layer hole MLH may be larger than, equal to or lesser than the reflective layer hole RLH, and the inner mask layer ML0 may be larger than, equal to or lesser than the inner reflective section RL0, wherein it depends on the desired illuminating effect. The inner mask layer ML0 and the inner reflective section RL0 are located above the light emitting unit LED. In this embodiment, the inner mask layer ML0 and/or the inner reflective section RL0 above the light emitting unit LED is at least partially projected between the two non-intersecting traces LT, HT or between the two non-intersecting traces STa, STb.

Each of the keyswitches KS comprises a part of the support plate SUP. In this embodiment, the support plate SUP has an inner hole Sc, a surrounding rib Sr0, a plurality of bridge ribs Sr1 and a support frame Sf, wherein the surrounding rib Sr0 surrounds the inner hole Sc, and the bridge ribs Sr1 connect the surrounding rib Sr0 and the support frame Sf. Furthermore, there are a plurality of peripheral holes SUPH between the bridge ribs Sr1, the surrounding rib Sr0 and the support frame Sf. In this embodiment, the two inner microstructure regions IMS at least partially overlap with projections of the inner hole Sc, the surrounding rib Sr0, the bridge ribs Sr1 and/or the support frame Sf. Still further, the two outer microstructure regions OMS at least partially overlap with projections of the surrounding rib Sr0, the plurality of bridge ribs Sr1 and/or the support frame Sf.

The keyswitch KS comprises a keycap KCC, a support mechanism SSR, a circuit board MEM and a support plate SUP. The keycap KCC is disposed with respect to the support plate SUP. The keycap KCC has an inner outlet KC0 and a plurality of outer outlets KC1, wherein the inner outlet KC0 and the outer outlets KC1 are surrounded by an opaque area KC2. The positions of the inner outlet KC0 and the outer outlets KC1 correspond to the positions of the inner hole Sc and the peripheral holes SUPH of the support plate SUP, such that the light emitted by the light emitting unit LED may be projected from the inner outlet KC0 and the outer outlets KC1 of the keycap KCC through the light guide panel LGP, the shielding sheet SS, the inner hole Sc and the peripheral holes SUPH of the support plate SUP. The support mechanism SSR is disposed between the keycap KCC and the support plate SUP. When the keycap KCC is pressed, the keycap KCC will move vertically toward the support plate SUP along with the support mechanism SSR. Furthermore, a restoration member (not shown) may be further disposed between the keycap KCC and the support plate SUP, wherein the restoration member may be, but is not limited to, a rubber dome. The circuit board MEM may have a switch (e.g. membrane switch or other trigger switches) corresponding to the keyswitch KS.

From top view, the light emitting unit LED, the light guide hole L0, the inner reflective section RL0, the inner mask layer ML0, the inner hole Sc, the inner outlet KC0 and the adhesive around the light guide hole L0 may be located between the two non-intersecting traces LT, HT and/or STa, STb.

From top view, the light emitting unit LED, the light guide hole L0, the inner reflective section RL0, the inner mask layer ML0, the inner hole Sc, the inner outlet KC0 and the adhesive around the light guide hole L0 may be located between the two inner microstructure regions IMS.

As shown in FIG. 4, the backlight module BLM further comprises a protrusion structure BP, wherein the position of the protrusion structure BP corresponds to the position of the light emitting unit LED, and the protrusion structure BP is located between the two non-intersecting traces LT, HT. Furthermore, the protrusion structure BP is also located between the microstructure regions MS, i.e. the protrusion structure BP is located between the two inner microstructure regions IMS and also located between the two outer microstructure regions OMS. In this embodiment, the protrusion structure BP is formed on the lighting board LCB and the protrusion structure BP forms a notch IP for accommodating the light emitting unit LED, such that an upper surface of the light emitting unit LED is flash with or lower than an upper surface of the light guide panel LGP and higher than a lower surface of the light guide panel LGP. Since the shielding sheet SS is disposed on the light guide panel LGP, the upper surface of the light emitting unit LED is also flash with or lower than a lower surface of the shielding sheet SS, such that the shielding sheet SS can be kept flat and will not be pushed by the light emitting unit LED to partially enter the inner hole Sc of the support plate SUP. Accordingly, the amount of light emitted by the light emitting unit LED entering the light guide panel LGP can be increased, so as to enhance the overall illuminating consistency. Moreover, the circuit board MEM may have a switch disposed with respect to the inner hole Sc of the support plate SUP, such that the switch may partially enter the inner hole Sc of the support plate SUP without interfering with the shielding sheet SS and the light emitting unit LED below the shielding sheet SS.

Figure 5:
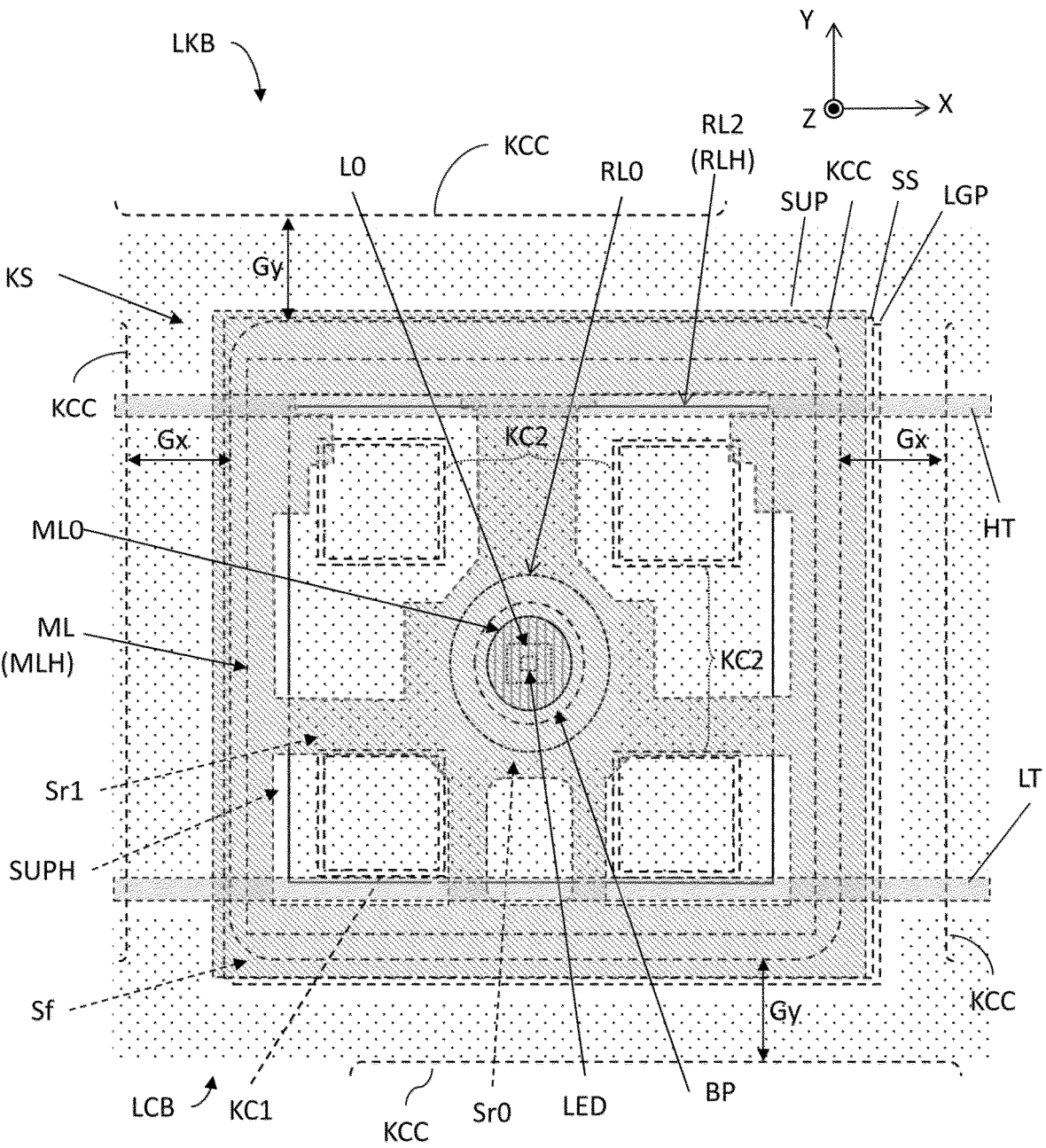
FIG. 5 is a partial top view illustrating the lighting keyboard according to another embodiment of the invention.
Figure 6:
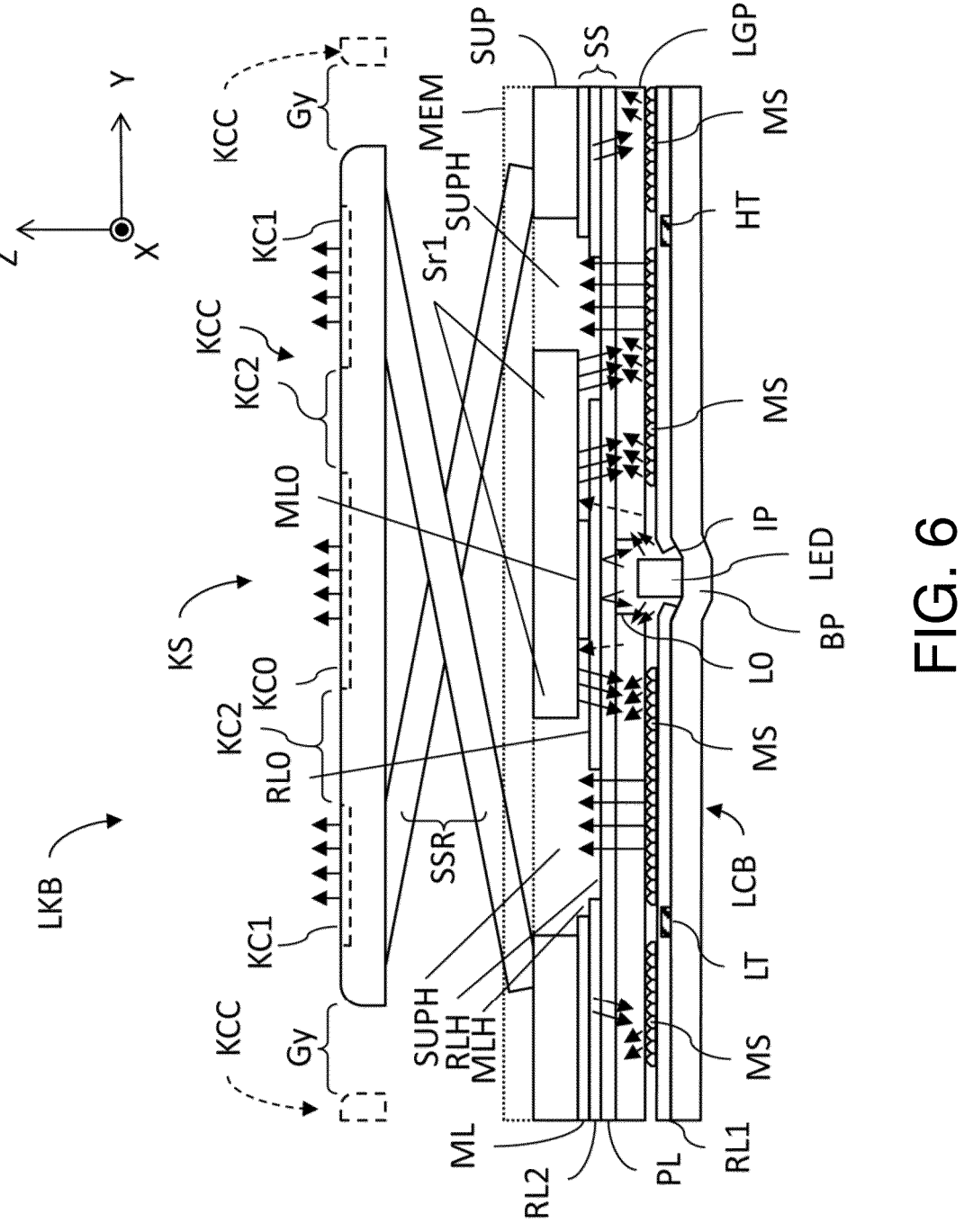
FIG. 6 is a partial sectional view illustrating the lighting keyboard shown in FIG. 5.

Referring to FIGS. 5 and 6, FIG. 5 is a partial top view illustrating the lighting keyboard LKB according to another embodiment of the invention, and FIG. 6 is a partial sectional view illustrating the lighting keyboard LKB shown in FIG. 5.

As shown in FIGS. 5 and 6, the support plate SUP may not have the aforesaid inner hole Sc. At this time, the shielding sheet SS is kept flat and will not be pushed by the light emitting unit LED. When the support plate SUP does not have the inner hole Sc, the keycap KCC may have no inner outlet KC0. However, if the keycap KCC has the inner outlet KC0, the peripheral holes SUPH around the central area of the keycap KCC may be used to emit light, such that the light is projected from the inner outlet KC0 without the inner hole Sc. In this embodiment, the two non-intersecting traces HT, LT may overlap with a projection of at least one of the at least one outer outlet KC1. As long as the two non-intersecting traces HT, LT meet at least one of the following three conditions, the traces HT, LT will not affect the light emitted from the outer outlet KC1 of the keycap KCC. Condition 1: the two non-intersecting traces HT, LT overlap with projections of the surrounding rib Sr0, the bridge ribs Sr1 and/or the support frame Sf. Condition 2: the two non-intersecting traces HT, LT overlap with projections of the mask layer ML and/or the second reflective layer RL2 of the shielding sheet SS. Condition 3: the two non-intersecting traces HT, LT overlap with projections of the opaque area KC2 of the keycap KCC.

Figure 7:
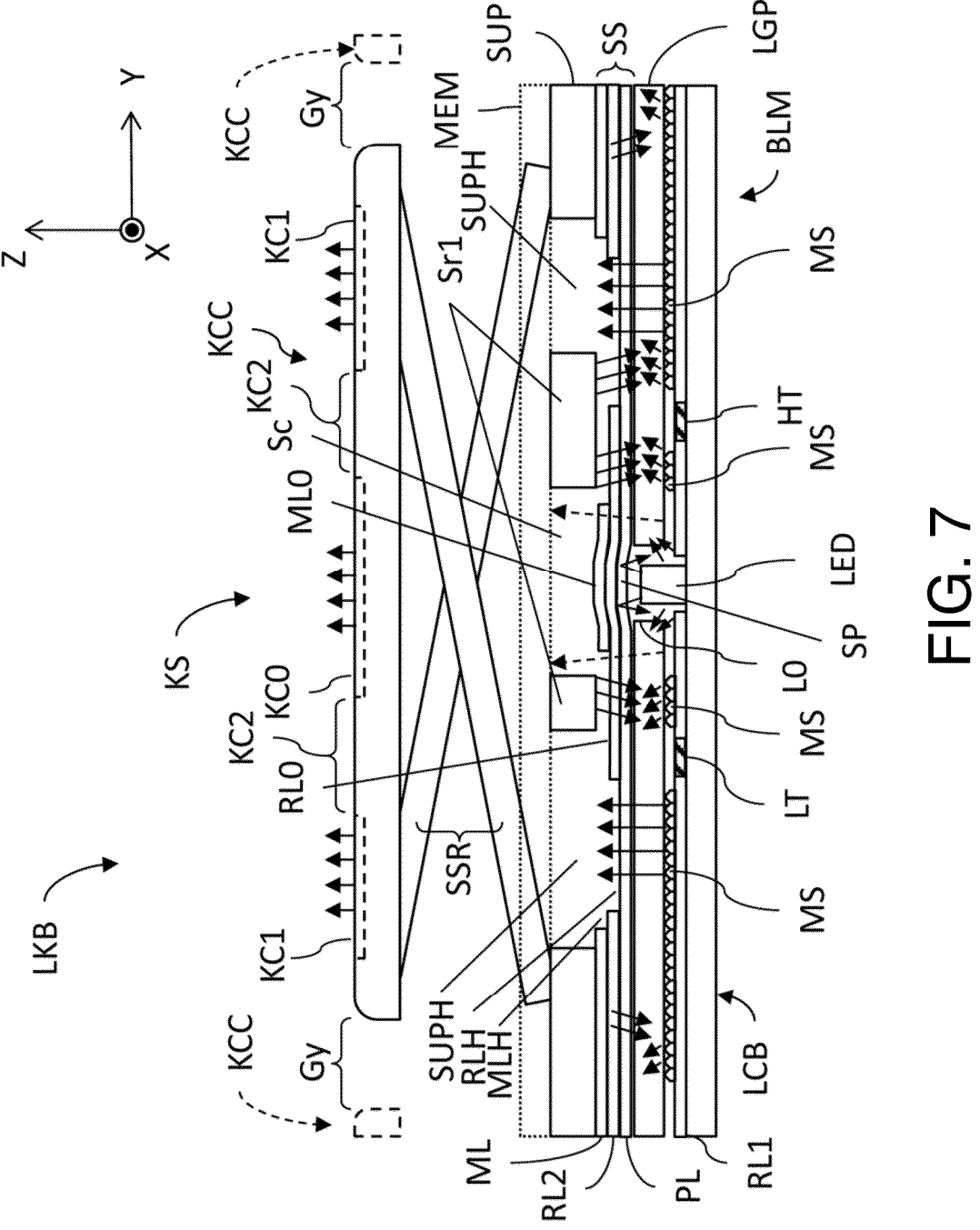
FIG. 7 is a partial sectional view illustrating the lighting keyboard according to another embodiment of the invention.

Referring to FIG. 7, FIG. 7 is a partial sectional view illustrating the lighting keyboard LKB according to another embodiment of the invention.

As shown in FIG. 7, a protrusion structure SP of the backlight module BLM may be formed on the shielding sheet SS, wherein the light emitting unit LED is located below the protrusion structure SP. The position of the protrusion structure SP corresponds to the position of the light emitting unit LED, and the protrusion structure SP is located between the two non-intersecting traces LT, HT. Furthermore, the protrusion structure SP is also located between the microstructure regions MS, i.e. the protrusion structure SP is located between the two inner microstructure regions IMS and also located between the two outer microstructure regions OMS. In this embodiment, the protrusion structure SP may be lower than or slightly enter the inner hole Sc of the support plate SUP, and an upper surface of the light emitting unit LED is flash with or lower than an upper surface of the light guide panel LGP or a lower surface of the shielding sheet SS. In FIG. 7, since the protrusion structure SP is formed on the shielding sheet SS, the second reflective layer RL0 of the shielding sheet SS above the light emitting unit LED forms a curved surface or an inclined surface due to the protrusion structure SP. Because the reflection angle provided by the flat second reflective layer RL0 is small, it is difficult to guide the light emitted upward to directly enter the wall of the light guide hole L0 of the light guide panel LGP.

Figure 8:
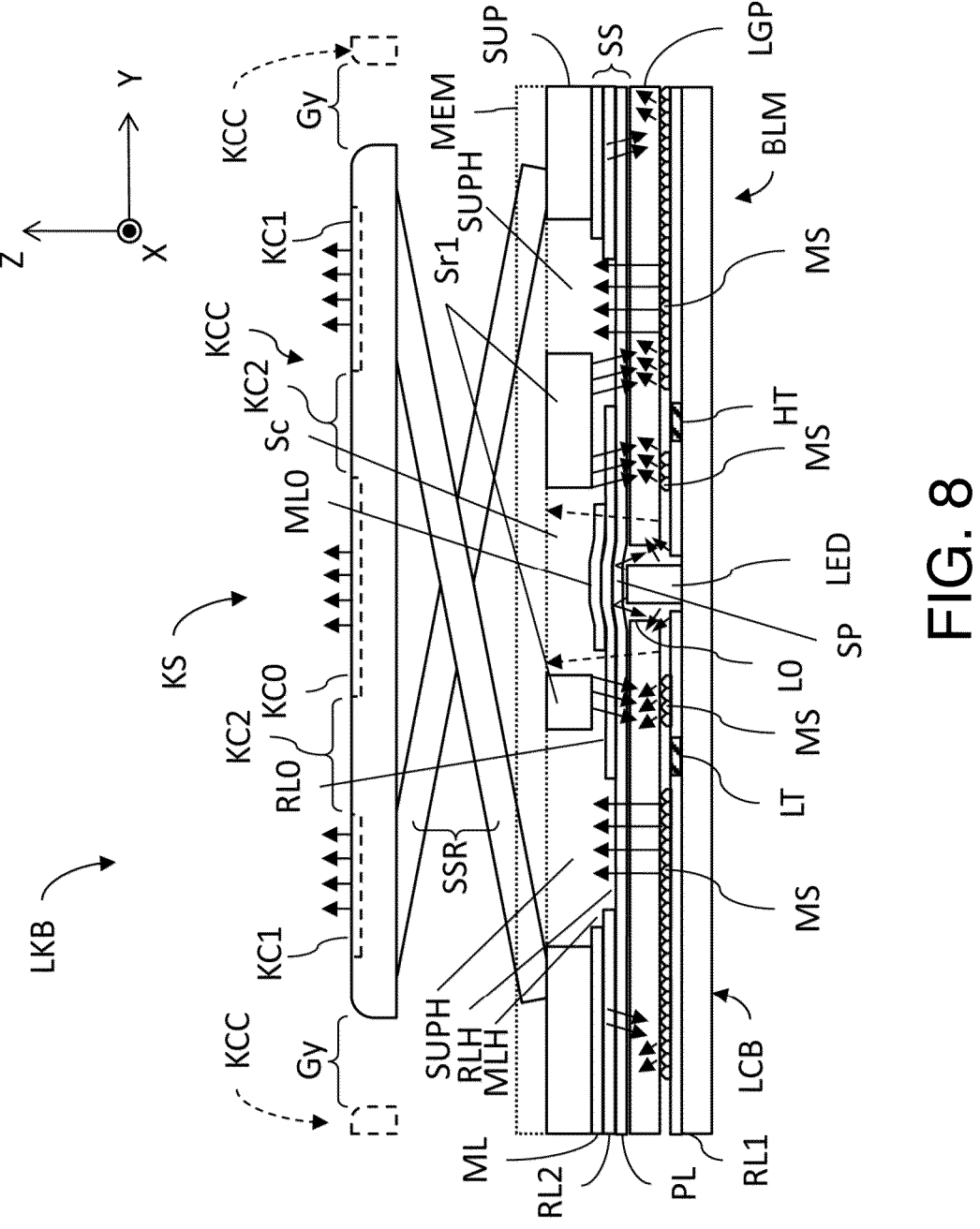
FIG. 8 is a partial sectional view illustrating the lighting keyboard according to another embodiment of the invention.

Referring to FIG. 8, FIG. 8 is a partial sectional view illustrating the lighting keyboard LKB according to another embodiment of the invention.

As shown in FIG. 8, an upper surface of the light emitting unit LED may be higher than an upper surface of the light guide panel LGP and lower than a lower surface of the shielding sheet SS, i.e. the upper surface of the light emitting unit LED may be located between the upper surface of the light guide panel LGP and the lower surface of the shielding sheet SS. In other words, if necessary, the upper surface of the light emitting unit LED may exceed the upper surface of the light guide panel LGP. For example, the protrusion structure SP protrudes upward may release the thickness of the shielding sheet SS itself and the thickness of the adhesive layers above and below the shielding sheet SS to provide a space for accommodating the light emitting unit LED. At this time, the upper surface of the light emitting unit LED is located between the lower surface of the support plate SUP and the upper surface of the light guide panel LGP. Accordingly, when the upper surface of the light emitting unit LED is higher than the upper surface of the light guide panel LGP, the protrusion structure SP may provide a space for accommodating the light emitting unit LED, so as to prevent the light emitting unit LED from interfering with the shielding sheet SS.

Figure 9:
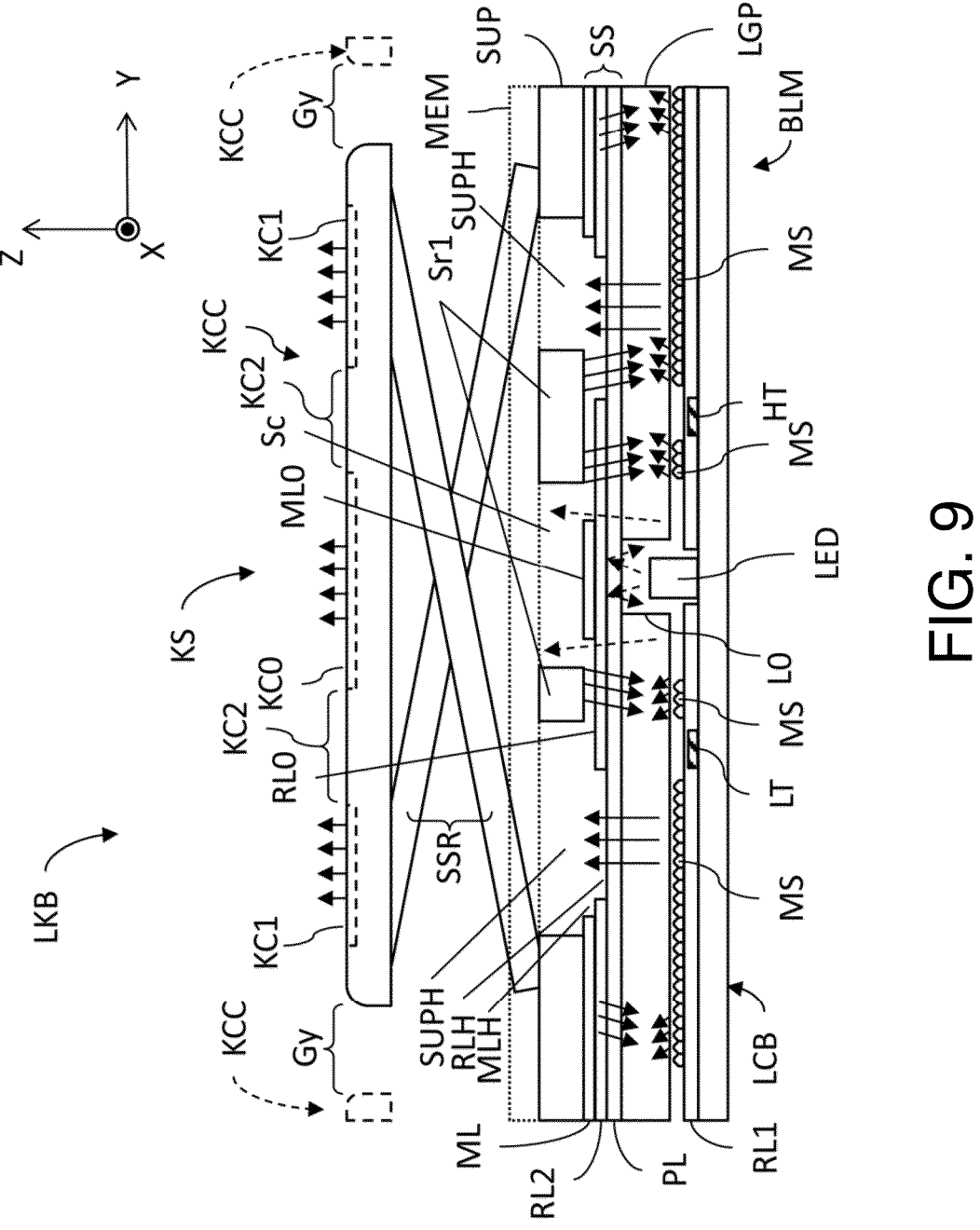
FIG. 9 is a partial sectional view illustrating the lighting keyboard according to another embodiment of the invention.

Referring to FIG. 9, FIG. 9 is a partial sectional view illustrating the lighting keyboard LKB according to another embodiment of the invention.

As shown in FIG. 9, the lighting keyboard LKB may not comprise the protrusion structure BP shown in FIG. 4 or the protrusion structure SP shown in FIG. 7. In this embodiment, an upper surface of the light emitting unit LED is flash with or lower than an upper surface of the light guide panel LGP and higher than a lower surface of the light guide panel LGP. Accordingly, the amount of light emitted by the light emitting unit LED entering the light guide panel LGP can be increased, so as to enhance the overall illuminating consistency.

Figure 10:
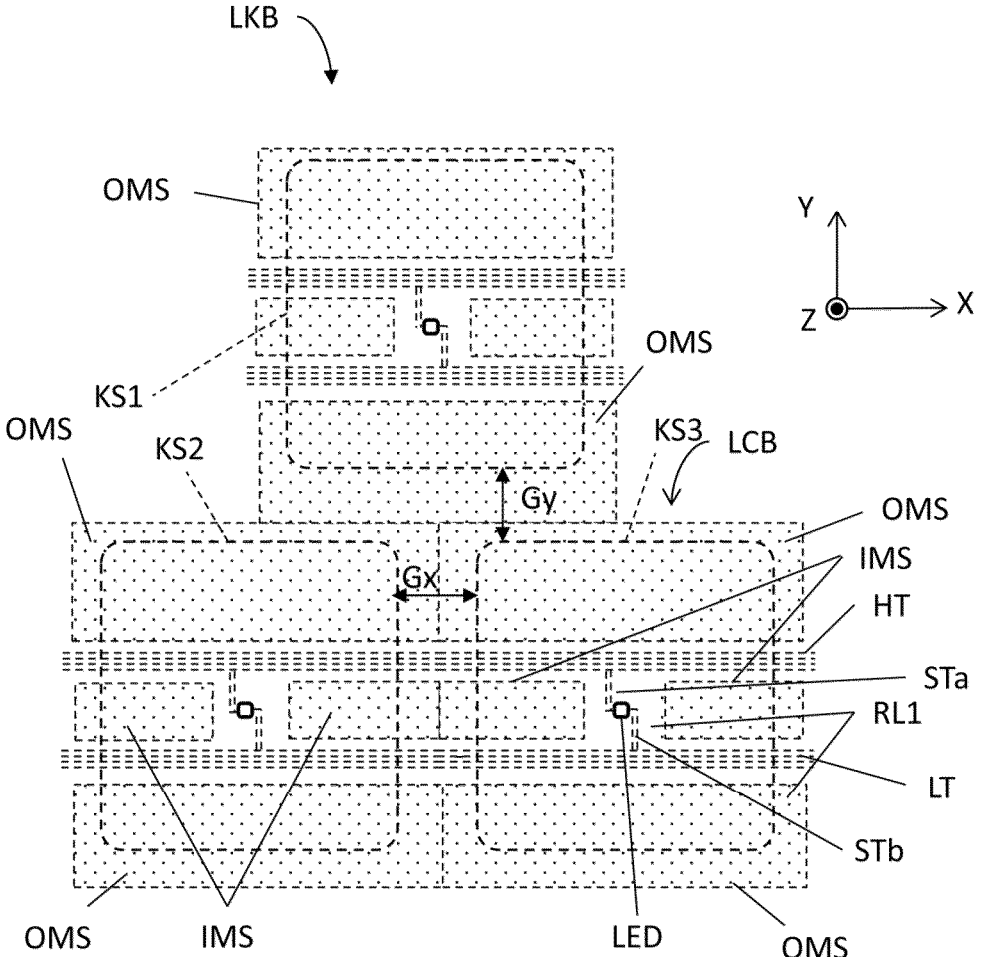
FIG. 10 is another partial top view illustrating the lighting keyboard shown in FIG. 1.

Referring to FIG. 10, FIG. 10 is another partial top view illustrating the lighting keyboard LKB shown in FIG. 1.

As shown in FIG. 10, at least parts of the microstructure regions OMS, IMS overlap with the gaps Gx, Gy between any two adjacent keyswitches KS1, KS2, KS3. Three adjacent keyswitches KS1, KS2, KS3 may have three adjacent outer microstructure regions OMS, wherein the three adjacent outer microstructure regions OMS are joined together in the X and Y directions. The two outer microstructure regions OMS disposed outside two non-intersecting traces of the lighting board LCB under a keyswitch KS may have the same pattern, which may have same size, same shape and same distance (outside the traces) in two identical regions. Within the projected range of a single keyswitch KS (e.g. square key), the two outer microstructure regions OMS may have different patterns defined by the keyswitch KS. For two adjacent keyswitches KS in the Y direction, the two outer microstructure regions OMS may have different patterns defined by the two adjacent keyswitches KS.

Figure 11:
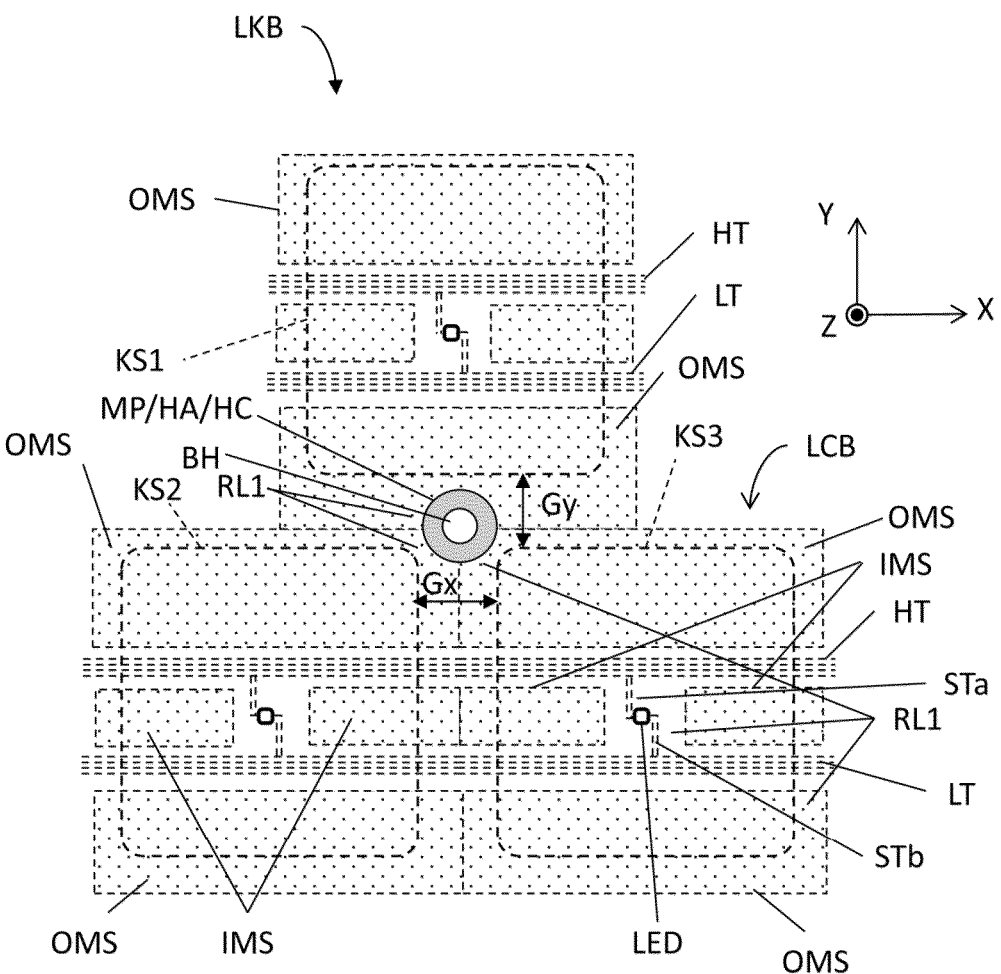
FIG. 11 is another partial top view illustrating the lighting keyboard shown in FIG. 1.

Referring to FIG. 11, FIG. 11 is another partial top view illustrating the lighting keyboard LKB shown in FIG. 1.

As shown in FIG. 11, a board hole BH may be formed on the lighting board LCB, wherein the board hole BH is used for fixing. A mask portion MP may be disposed on the lighting board LCB, wherein the mask portion MP surrounds the board hole BH and is used to shield and absorb light, so as to prevent the light from leaking from the board hole BH. In practice, the mask portion MP may be a light absorbing or opaque substrate of the lighting board LCB, i.e. the first reflective layer RL1, trace layer and insulating layer (if necessary) above the substrate of the lighting board LCB are all formed with corresponding holes larger than the board hole BH, so as to expose the mask portion MP surrounding the board hole BH. Another manner in practice is to coat a layer of mask portion MP on the upper surface of the first reflective layer RL1 of the lighting board LCB to surround the board hole BH. At this time, the hole size of the first reflective layer RL1 is similar to the board hole BH. The board hole BH and the mask portion MP on the lighting board LCB may correspond to a board hole and a mask portion (not shown) on the shielding sheet SS. A hole adhesive HA on the lighting board LCB may be disposed on the mask portion MP and surround the board hole BH. A hole clearance HC does not overlap with the outer microstructure regions OMS or any microstructure. The hole clearance HC without the first reflective layer RL1 may be defined between the first reflective layer RL1 and the board hole BH. The hole clearance HC without an adhesive may be defined between the hole adhesive HA and the board hole BH. The inner microstructure regions (between the two non-intersecting traces HT, LT and/or between the two non-intersecting traces STa, STb) do not overlap with the board hole BH, the hole adhesive HA and/or the hole clearance HC. A plurality of adjacent keyswitches KS1, KS2, KS3 in the X and/or Y direction may have adjacent outer microstructure regions OMS that jointly surround the mask portion MP, the board hole BH, the hole adhesive HA and/or the hole clearance HC. The mask portion MP, the board hole BH, the hole adhesive HA and/or the hole clearance HC is located between the traces HT, LT corresponding to the keyswitch KS1 and the traces HT, LT correspond to the keyswitches KS2, KS3. For further explanation, the mask portion MP, the board hole BH, the hole adhesive HA and/or the hole clearance HC may be located between the trace LT corresponding to the keyswitch KS1 and the trace HT correspond to the keyswitches KS2, KS3. It should be noted that the mask portion MP, the hole adhesive HA and the hole clearance HC are schematically illustrated at the same position shown in FIG. 11. However, the definitions of the mask portion MP, the hole adhesive HA and the hole clearance HC can be clearly understood from the above description.

As mentioned in the above, the invention makes the plurality of microstructure regions on the lighting board not overlap with the two non-intersecting traces. Accordingly, the microstructure regions specifically arranged on the lighting board can be used to recycle light or assist light output, so as to enhance the overall illuminating consistency. Furthermore, although the technical feature of the invention is depicted to solve the problem of low power light emitting unit, the invention is also applicable to an application of medium or high power light emitting unit in a backlight module.

A backlight module may use mini LED as its light emitting unit, and its light guide panel will expand and contract greatly in a length direction of a lighting keyboard in an overcooling or overheating environment. However, a lighting board will expand and contract less in the same direction. Thus, the difference in expansion and contraction between the light guide panel and the lighting board may result in that the light guide hole on the light guide panel to extrude the light emitting unit accommodated therein. If the extrusion situation is severe, the light emitting unit may even fall off the lighting board. In view of this, the features of the following embodiments mainly focus on avoiding the above-mentioned extrusion situation.

Figure 12:
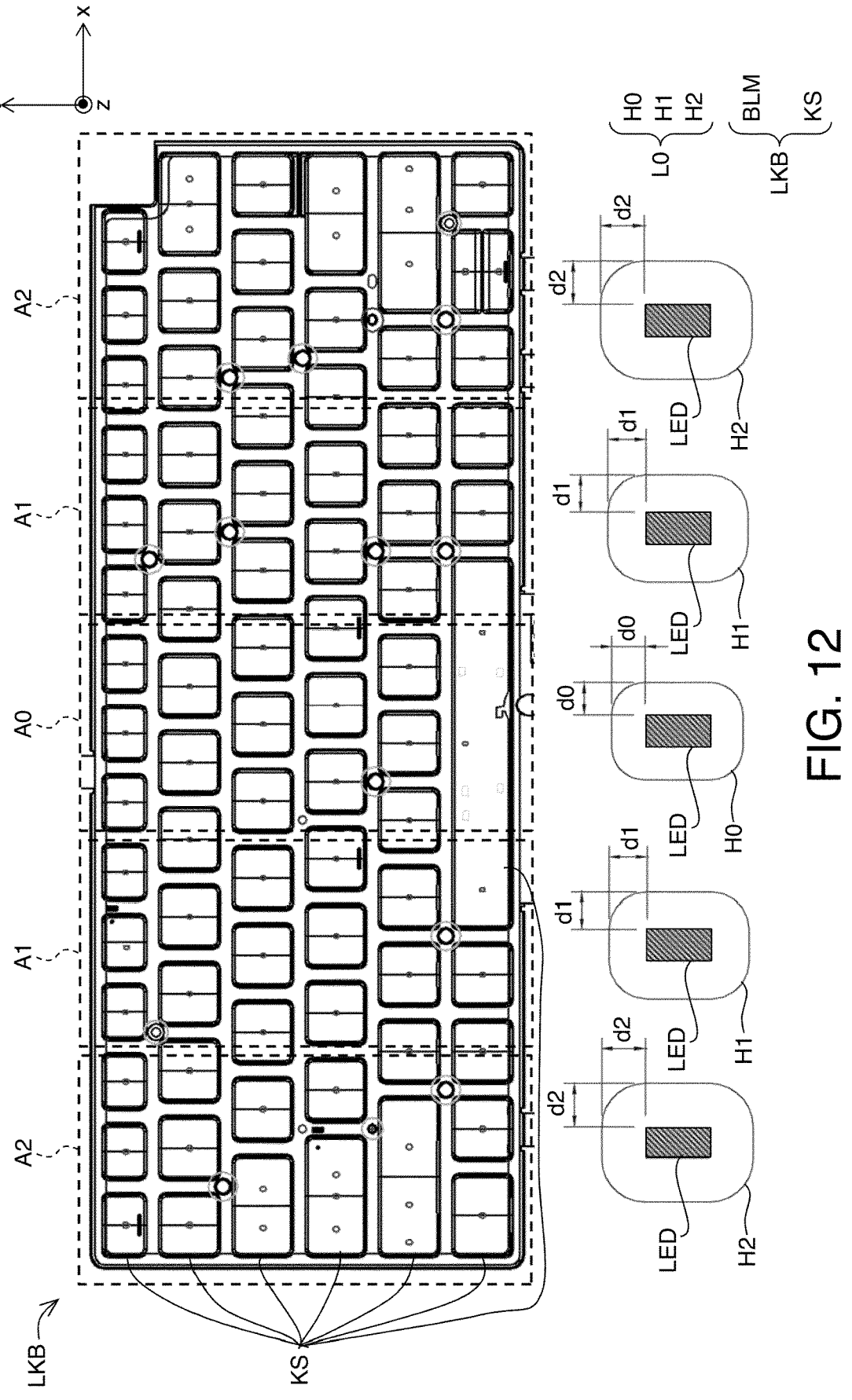
FIG. 12 is a schematic view illustrating different types of divisions and light guide holes of a lighting keyboard according to another embodiment of the invention.

Referring to FIG. 12, FIG. 12 is a schematic view illustrating different types of divisions and light guide holes of the lighting keyboard LKB according to another embodiment of the invention.

In this embodiment, the light emitting units LED used in the backlight module BLM for the lighting keyboard LKB are mini LED. Each keyswitch KS of the lighting keyboard LKB corresponds to at least one mini LED. According to the length of the keyswitch KS, the arrangement of quantity of mini LED may be changed. For example, a square key in the keyswitch KS of the lighting keyboard LKB may be provided with 1 mini LED, and a multiple key in the keyswitch KS may be provided with 2 to 3 mini LEDs. The light guide panel LGP of the backlight module BLM in this embodiment includes a plurality of light guide holes L0, and each of the light emitting units LED is located in each of the light guide holes L0. The backlight module BLM may be divided into a plurality of regions, and these regions include a middle region A0, two first side regions A1 and two second side regions A2. The first side regions A1 are located outside the middle region A0, and the second side regions A2 are located outside the first side regions A1. The light guide holes L0 include the middle light guide holes H0, the first light guide holes H1 and the second light guide holes H2 wherein they have different sizes for corresponding to different regions. The middle light guide holes H0 are located in the middle region A0, the first light guide holes H1 are located in the first side regions A1, and the second light guide holes H2 are located in the second side regions A2. The distance between the light emitting unit LED located in the middle light guide hole H0 and the hole wall of the middle light guide hole H0 is represented by the distance d0. The distance between the light emitting unit LED located in the first light guide hole H1 and the hole wall of the first light guide hole H1 is represented by distance d1. The distance between the light emitting unit LED located in the second light guide hole H2 and the hole wall of the second light guide hole H2 is represented by the distance d2. In this embodiment, the distance d0 is lesser than distance d1, and distance d1 is lesser than distance d02, namely d0<d1<d2. In practice, the distance d0 may be but not limited to be 0.3 mm, the distance d1 may be but not limited to be 0.35 mm, and the distance d2 may be but not limited to be 0.4 mm. Since most of the aforementioned undesirable extrusion situation usually occurs on both sides of the length sides of the backlight module, making the larger distance between the light guide holes closer to the side regions and the light emitting units can effectively avoid that the light guide panel extrudes the light emitting units accommodated therein during the expansion and contraction.

Regarding the size of the light guide holes L0, the size of the second light guide holes H2 corresponding to the second side region A2 is the greatest, the size of the first light guide holes H1 corresponding to the first side regions A1 is second, and the size of the light guide hole H0 corresponding to the middle region A0 is the least. In practice, the first light guide holes H1 corresponding to the first side regions A1 may be but not limited to be 12% to 25% greater than the middle light guide holes H0 corresponding to the middle regions A0, while the second light guide holes H2 corresponding to the second side region A2 may be but not limited to be 26% to 42% greater than the middle light guide holes H0 corresponding to the middle regions A0. It should be noted that in order to highlight the features of this embodiment, FIG. 12 shows every type of a single light guide hole corresponding to each region below the middle region A0, the first side region A1 and the second side region A2. However, it should be understood that the middle light guide holes H0, the first light guide holes H1 and the second light guide holes H2 are formed on the light guide panel LGP, in practice. Moreover, the dotted lines for division shown in FIG. 12 are simplified for reference only. In practice, the boundary arrangement for the light guide holes corresponding to different regions on the light guide panel LGP are determined by the edge of the keyswitches KS.

Figures 13A, 13B:
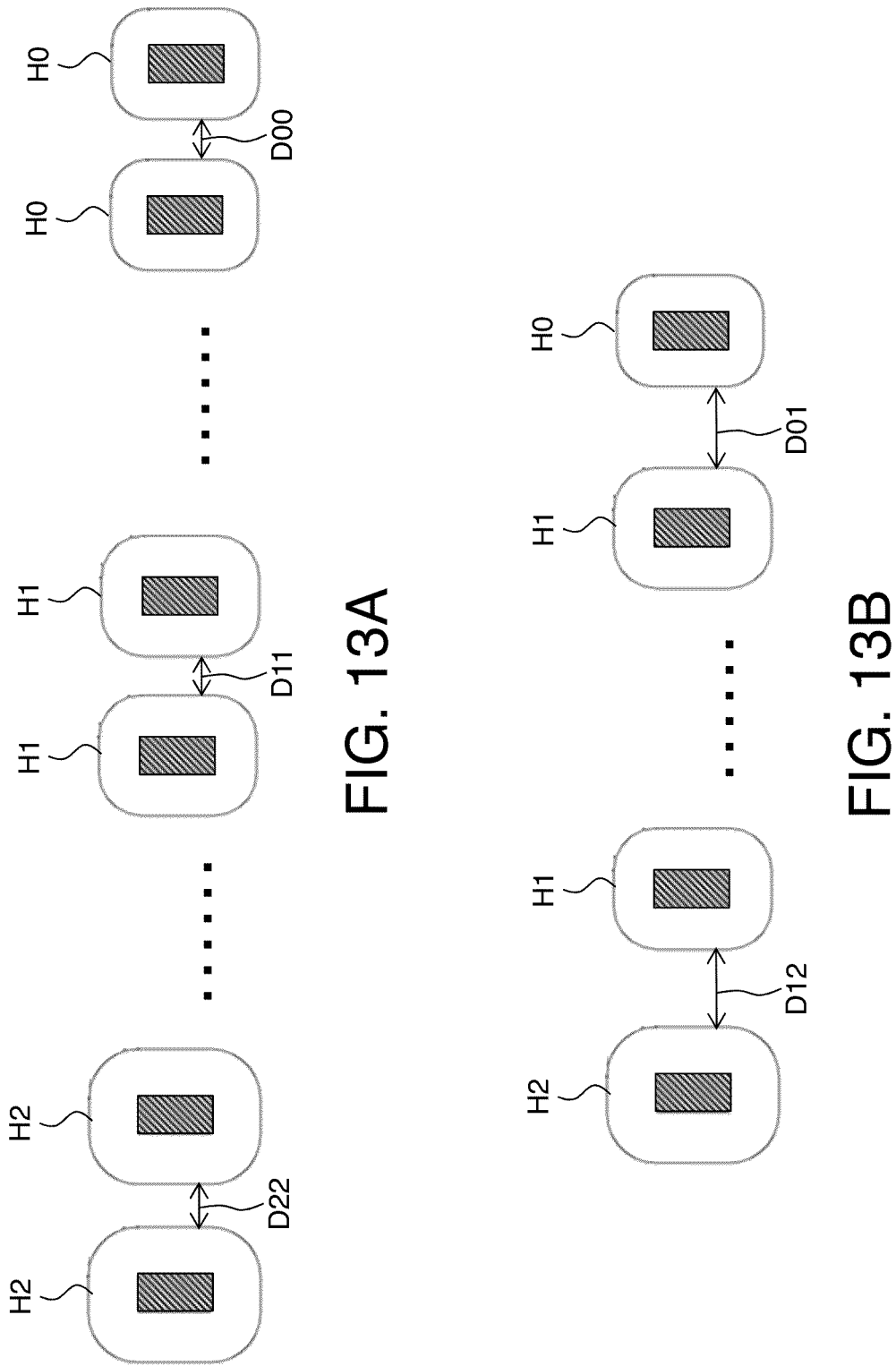
FIG. 13A is a schematic view corresponding to FIG. 12 and illustrating the adjacent light guide holes in the same region.
FIG. 13B is a schematic view corresponding to FIG. 12 and illustrating the adjacent light guide holes across two regions.

Referring to FIG. 13A and FIG. 13B, FIG. 13A is a schematic view corresponding to the embodiment of FIG. 12 and illustrating the adjacent middle light guide holes H0, the adjacent first light guide holes H1 and the adjacent second light guide holes H2; and FIG. 13B is a schematic view corresponding to the embodiment of FIG. 12 and illustrating the middle light guide hole H0 and the first light guide hole H1 which are adjacent, as well as the first light guide hole H1 and the second light guide hole H2 which are adjacent.

As shown in FIG. 13A, the distance between the hole walls of two adjacent middle light guide holes H0 located in the middle region A0 is represented by the distance D00, the distance between the hole walls of two adjacent first light guide holes H1 located in each of the first side regions A1 is represented by the distance D11, and the distance between the hole walls of two adjacent second light guide holes H2 located in each of the second side regions A2 is represented by the distance D22. In this embodiment, the distance D00 is greater than the distance D11, and the distance D11 is greater than the distance D22, namely D00>D11>D22. That is, the light guide holes L0 being closer to the outer position of the light guide panel LGP are arranged more closely, and the light guide holes L0 being closer to the center position of the light guide panel LGP are more distantly. In addition, as shown in FIG. 13B, the distance between the middle light guide hole H0 and the first light guide hole H1 which are adjacent is represented by the distance D01. The distance between the first light guide hole H1 and the second light guide hole H2 which are adjacent is represented by distance D12. In this embodiment, the distance D01 is greater than the distance D12, namely D01>D12. That is, the hole-wall distance between the adjacent light guide holes L0 across the different regions being closer to the center position of the light guide panel LGP are much farther, and the hole-wall distance between the adjacent light guide holes L0 across the different regions being closer to the outer position of the light guide panel LGP are much closer.

Figure 14:
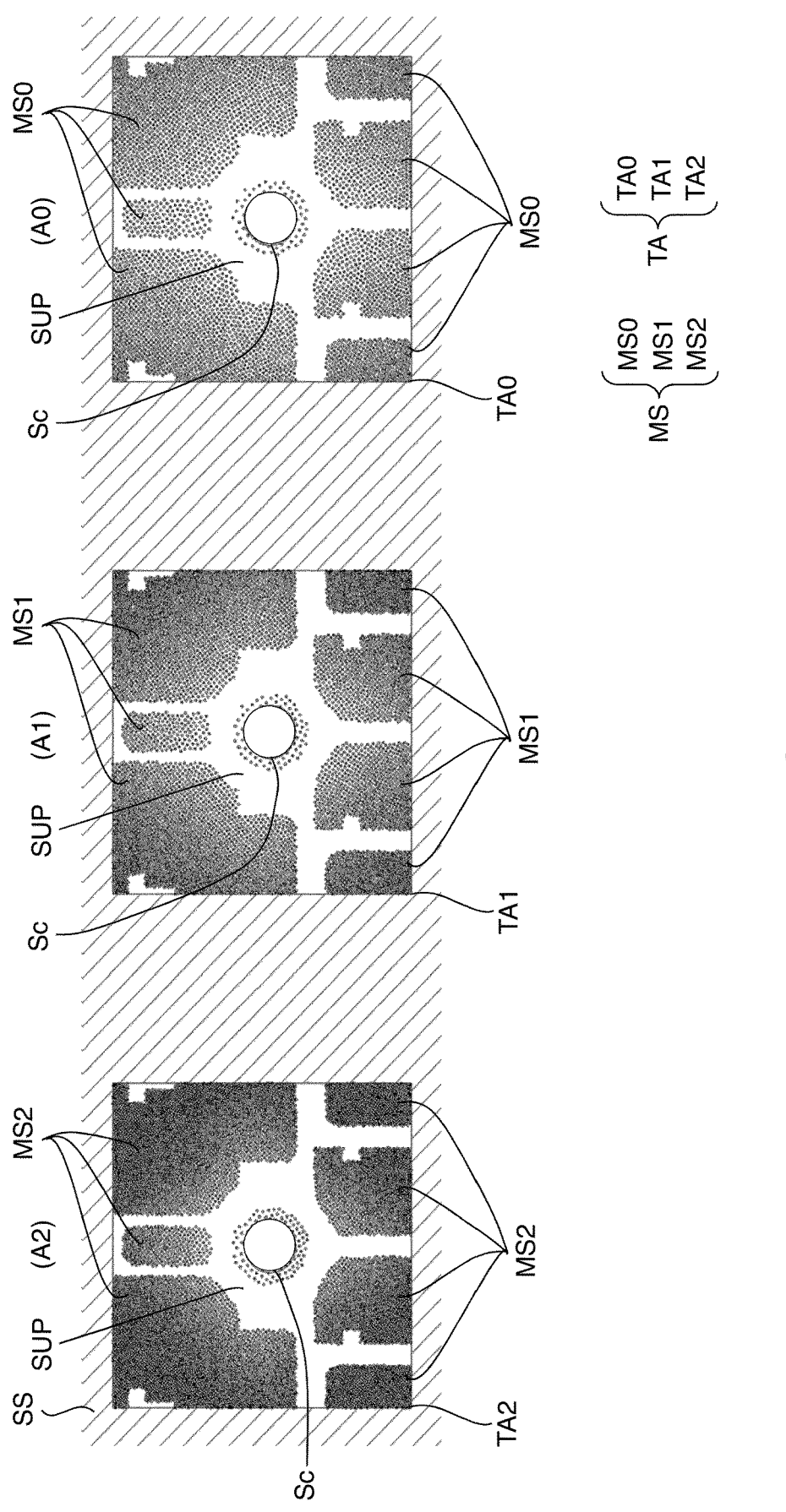
FIG. 14 is a schematic view illustrating a shielding sheet, microstructure regions and a support plate of a backlight module according to another embodiment of the invention.

Referring to FIG. 14, FIG. 14 is a schematic view illustrating the shielding sheet SS, the microstructure regions MS and the support plate SUP of the backlight module BLM according to another embodiment of the invention.

Because of the arrangement of different sizes of the light guide holes L0 (e.g. the middle light guide holes H0, the first light guide holes H1, and the second light guide holes H2) provided on the light guide panel LGP to correspond to different regions (e.g. the middle region A0, the first side region A1 and the second side region A2), the light coupling efficiency will decrease when the distance between the light guide hole L0 and the light emitting unit LED is much greater. In this regard, microstructure regions MS with different densities of microstructural dots may be provided corresponding to different regions, and then the luminous uniformity can be achieved. The shielding sheet SS is disposed below the support plate SUP and above the microstructure regions MS, and the shielding sheet SS has a plurality of translucent regions TA. The portion of the support plate SUP shown in FIG. 14 is its rib region (e.g. the surrounding rib Sr0 and/or the bridge rib Sr1 shown in FIG. 3). The microstructure regions MS are partially exposed by each of the translucent regions TA. The translucent regions TA are distributed in the middle regions A0, the first side regions A1 and the second side regions A2. The translucent regions TA may include the middle translucent regions TA0 located in the middle region A0, the first translucent regions TA1 located in the first side regions A1 and second translucent regions TA2 located in the second side regions A2. In this embodiment, the microstructure regions MS may be formed on a lower surface of the light guide panel LGP and/or an upper surface of the first reflective layer RL1 of the lighting board LCB. As shown in FIG. 14, only three microstructure regions MS exposed by the translucent regions TA are drawn for simplicity. The microstructure regions MS may include the middle microstructure regions MS0 exposed by the middle translucent regions TA0, the first microstructure regions MS1 exposed by the first translucent regions TA1 and the second microstructure regions MS2 exposed by the second translucent regions TA2.

In this embodiment, the average density of microstructural dots (micro-dot) of the middle microstructure region MS0 exposed by the middle translucent region TA0 relative to the area of the middle translucent region TA0 is lesser than the average density of microstructural dots of the first microstructure region MS1 exposed by the first translucent region TA1 relative to the area of the first translucent region TA1, while the average density of microstructural dots of the first microstructure region MS1 exposed by the first translucent region TA1 relative to the area of the first translucent region TA1 is lesser than the average density of microstructural dots of exposed by the second translucent region TA2 relative to the area of the second translucent region TA2. That is, the average density of microstructural dots corresponding to the second translucent regions TA2 is the greatest, the average density of microstructural dots corresponding to the first translucent regions TA1 is second, and the average density of microstructural dots corresponding to the middle translucent regions TA0 is the least. In practice, the ratio of the average density of microstructural dots corresponding to the second translucent regions TA2 may be but not limited to be 60% to 80%, the ratio of the average density of microstructural dots corresponding to the first translucent regions TA1 may be but not limited to be 40% to 60%, and the ratio of the average density of microstructural dots corresponding to the middle translucent regions TA0 may be but not limited to be 20% to 40%. That is, when the distance between the corresponding light guide hole L0 and the light-emitting unit LED is relatively greater (e.g. corresponding to the middle light guide hole H0 located in the middle region A0), the microstructural dots exposed by the middle translucent region TA0 corresponding to the middle light guide hole H0 may be configured to be much denser, so as to increase the brightness to solve the problem about decreased light coupling efficiency.

Figure 15:
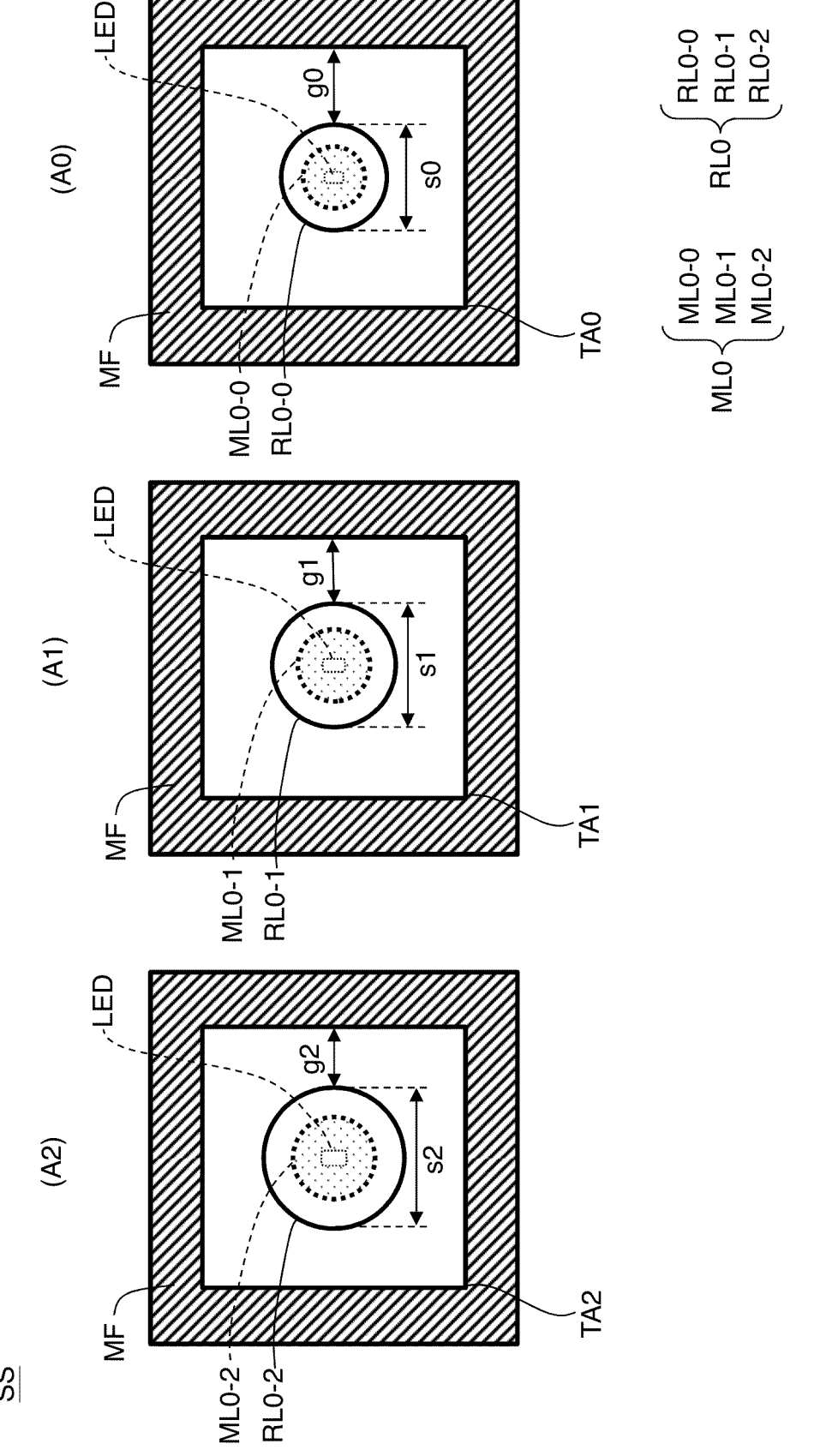
FIG. 15 is a schematic view illustrating a shielding sheet of a backlight module according to another embodiment of the invention.

Referring to FIG. 15, FIG. 15 is a schematic view illustrating the shielding sheet SS of the backlight module BLM according to another embodiment of the invention. In view of the arrangement of different sizes of the light guide holes L0 (e.g. the middle light guide holes H0, the first light guide holes H1 and the second light guide holes H2) provided on the light guide panel LGP to correspond to different regions (e.g. the middle regions A0, the first side regions A1 and the second side regions A2), different arrangements of the shielding sheet SS to correspond to the different regions are needed in order to achieve the luminous uniformity. Corresponding to every light-emitting unit LED below the shielding sheet SS, the shielding sheet SS is provided with the inner reflective section RL0 and the masking ink frame MF defining the translucent region TA. Each of the inner reflective sections RL0 is in one of the translucent regions TA. The inner reflective section RL0 may include a middle inner reflective section RL0-0 located in the middle translucent region TA0 of the middle region A0, a first inner reflective section RL0-1 located in the first translucent region TA1 of the first side region A1, and a second inner reflective section RL0-2 located in the second translucent region TA2 of the second side region A2. In this embodiment, the size of the middle inner reflective section RL0-0 (e.g. diameter s0 as shown) is lesser than the size of the first inner reflective section RL0-1 (e.g. the diameter s1 as shown), and the size of the first inner reflective section RL0-1 (e.g. the diameter s1 as shown) is lesser than the size of the second inner reflective section RL0-2 (e.g. the diameter s2), namely $s0<s1<s2$. Therefore, when the size of the inner reflective section RL0 is greater, more light can reach corners of the translucent region TA, such that the arrangement of light guide holes L0 of different sizes in each region can achieve the luminous uniformity.

Also, it can be seen from the arranging $s0<s1<s2$ that the gap g0 between the middle inner reflective section RL0-0 and the middle translucent region TA0 is greater than the gap g1 between the first inner reflective section RL0-1 and the first translucent region TA1. The gap g1 is greater than the gap g2 between the second inner reflective section RL0-2 and the second translucent region TA2. That is, $g0>g1>g2$. In this embodiment, the shielding sheet SS is further provided with the inner mask layer ML0 above the light emitting units LED being below the shielding sheet SS. Each the inner mask layers ML0 is located in the translucent region TA. The inner mask layer ML0 may be include a middle inner mask portion ML0-0 located in the middle translucent region TA0 of the middle region A0, a first inner mask portion ML0-1 located in the first translucent region TA1 of the first side region A1, and a second inner mask portion ML0-2 located in the second translucent region TA2 of the second side region A2. However, the shielding sheet SS is not limited to certainly have the internal mask layer ML0. For example, the inner reflective section RL0 is able to provide a shielding effect if the middle part of the inner reflective section RL0 is formed of a thicker white ink, and then the internal mask layer ML0 can be omitted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module for a lighting keyboard, comprising:
   a lighting board comprising a plurality of light emitting units;
   a light guide panel disposed on the lighting board and including a plurality of light guide holes, each of the plurality of light emitting units being located in each of the plurality of light guide holes; and
   a shielding sheet disposed on the light guide panel;
   wherein the backlight module is divided into a plurality of regions including a middle region and two first side regions, the two first side regions are located outside the middle region, the plurality of light guide holes include at least one middle light guide hole and at least one first light guide hole, the at least one middle light guide hole is in the middle region, the at least one first light guide hole is in any of the two first side regions, and a distance between a light emitting unit of the plurality of light emitting units in the at least one middle light guide hole and a wall of the at least one middle light guide hole is lesser than a distance between a light emitting unit of the plurality of light emitting units in the at least one first light guide hole and a wall of the at least one first light guide hole.

2. The backlight module according to claim 1, wherein the at least one middle light guide hole includes two adjacent middle light guide holes in the middle region, and the at least one first light guide hole includes two adjacent first light guide holes in one of the two first side regions, and a distance between hole walls of the two adjacent middle light guide holes is greater than a distance between hole walls of the two adjacent first light guide holes.

3. The backlight module according to claim 1, wherein the plurality of regions further include two second side regions, the two second side regions are located outside the two first side regions, the plurality of light guide holes further include at least one second light guide hole, the at least one second light guide hole is in any of the two second side region, and a distance between one of the plurality of light emitting unit in the at least one first light guide hole and a hole wall of the at least one first light guide hole is lesser than a distance between one of the plurality of light emitting units in the at least one second light guide hole and a hole wall of the at least one second light guide hole.

4. The backlight module according to claim 3, wherein the at least one first light guide hole includes two adjacent first light guide holes in one of the two first side regions, the at least one second light guide hole includes two adjacent second light guide holes in one of the two second side regions, and a distance between hole walls of the two adjacent first light guide holes is greater than a distance between hole walls of the two adjacent second light guide holes.

5. The backlight module according to claim 3, wherein the at least one first light guide hole includes one first light guide hole being adjacent to the at least one middle light guide hole and another first light guide hole being adjacent to the at least one second light guide, and a distance between the at least one middle light guide hole and the first light guide hole being adjacent to the at least one middle light guide hole is greater than a distance between the first light guide hole being adjacent to the at least one second light guide and the at least one second light guide hole.

6. The backlight module according to claim 1, wherein the backlight module further comprises a plurality of microstructure regions, the lighting board includes two non-intersecting traces, at least one of the plurality of light emitting units is connected between the two non-intersecting traces, and the plurality of microstructure regions are not overlapping with the two non-intersecting traces.

7. The backlight module according to claim 6, wherein the plurality of microstructure regions comprises two inner microstructure regions and two outer microstructure regions, the two inner microstructure regions are located between the two non-intersecting traces, and the two outer microstructure regions are located beyond the two non-intersecting traces.

8. The backlight module according to claim 6, wherein at least one of the plurality of light guide holes is located between two of the plurality of microstructure regions and/or located between the two non-intersecting traces.

9. A backlight module for a lighting keyboard, comprising:
   a plurality of microstructure regions;
   a light guide panel; and
   a shielding sheet disposed on the light guide panel and disposed above the plurality of microstructure regions, the shielding sheet having a plurality of translucent regions, the plurality of microstructure regions being partly exposed in each of the plurality of translucent regions;
   wherein the backlight module is divided into a plurality of regions including a middle region and two first side regions, the two first side regions are located outside the middle region, the plurality of translucent regions are distributed in the middle region and the two first side regions, and an average density of microstructural dots of one of the plurality of microstructure regions exposed by one of the plurality of translucent regions which is in the middle region relative to an area of the one of the plurality of translucent regions which is in the middle region is lesser than an average density of microstructural dots of another one of the plurality of microstructure regions exposed by another one of the plurality of translucent regions which is in one of the two first side regions relative to an area of the another one of the plurality of translucent regions which is in the one of the two first side regions.

10. The backlight module according to claim 9, wherein the plurality of regions further include two second side regions, the two second side regions are located outside the two first side regions, the plurality of translucent regions are distributed in the middle region, the two first side regions and the two second side regions, and an average density of microstructural dots of one of the plurality of microstructure regions exposed by the one of the plurality of translucent regions which is in one of the two first side regions relative to an area of the one of the plurality of translucent regions which is in the one of the two first side regions is lesser than an average density of microstructural dots of another one of the plurality of microstructure regions exposed by another one of the plurality of translucent regions which is in one of the two second side regions relative to an area of the another one of the plurality of translucent regions which is in the one of the two second side regions.

11. The backlight module according to claim 9, wherein the backlight module further comprises a lighting board, the lighting board includes two non-intersecting traces and at least one light emitting unit, the at least one light emitting unit is connected between the two non-intersecting traces, and the plurality of microstructure regions are not overlapping with the two non-intersecting traces.

12. The backlight module according to claim 9, wherein the backlight module further comprises a lighting board, the lighting board includes at least one light emitting unit, and the plurality of microstructure regions comprises two inner microstructure regions located at opposite sides of the at least one light emitting unit.

13. The backlight module according to claim 9, wherein the backlight module further comprises a lighting board, the lighting board includes two non-intersecting traces, and the plurality of microstructure regions comprises two outer microstructure regions located at opposite sides of the two non-intersecting traces.

14. A backlight module for a lighting keyboard, comprising:

a lighting board;

a light guide panel disposed on the lighting board; and a shielding sheet disposed on the light guide panel, the shielding sheet having a plurality of translucent regions and a plurality of inner reflective sections, each of the plurality of inner reflective sections being in each of the plurality of translucent regions;

wherein the backlight module is divided into a plurality of regions including a middle region and two first side regions, the two first side regions are located outside the middle region, the plurality of translucent regions are distributed in the middle region and the two first side regions, and a size of one of the plurality of inner reflective sections in one of the plurality of translucent regions which is in the middle region is lesser than a size of another one of the plurality of inner reflective sections in another one of the plurality of translucent regions which is in one of the two first side regions.

15. The backlight module according to claim 14, wherein a gap between the one of the plurality of inner reflective sections in the one of the plurality of translucent regions which is in the middle region and a boundary of the one of the plurality of translucent regions which is in the middle region is greater than a gap between the another one of the plurality of inner reflective sections in the another one of the plurality of translucent regions which is in the one of the two first side regions and a boundary of the another one of the plurality of translucent regions in the one of the two first side regions.

16. The backlight module according to claim 14, wherein the plurality of regions further include two second side regions, the two second side regions are located outside the two first side regions, the plurality of translucent regions are distributed in the middle region, the two first side regions and the two second side regions, and a size of the another one of the plurality of inner reflective sections in the another one of the plurality of translucent regions which is in the one of first side regions is lesser than a size of still another one of the plurality of inner reflective sections in still another one of the plurality of translucent regions which is in one of the two second side regions.

17. The backlight module according to claim 16, wherein a gap between the another one of the plurality of inner reflective sections in the another one of the plurality of translucent regions which is in the one of the two first side regions and a boundary of the another one of the plurality of translucent regions which is in the one of the two first side regions is greater than a gap between the still another one of the plurality of inner reflective sections in the still another one of the plurality of translucent regions which is in the one of the two second side regions and a boundary of the still another one of the plurality of translucent regions in the one of the two second side regions.

18. The backlight module according to claim 14, wherein the backlight module further comprises a plurality of microstructure regions, the lighting board includes two non-intersecting traces and at least one light emitting unit, the at least one light emitting unit is connected between the two non-intersecting traces, and the plurality of microstructure regions are not overlapping with the two non-intersecting traces.

19. The backlight module according to claim 18, wherein the lighting board includes at least one light emitting unit, and the plurality of microstructure regions comprises two inner microstructure regions located at opposite sides of the at least one light emitting unit.

20. The backlight module according to claim 18, wherein the lighting board includes two non-intersecting traces, and the plurality of microstructure regions comprises two outer microstructure regions located at opposite sides of the two non-intersecting traces.

\* \* \* \* \*